United States Patent
Shiga et al.

(10) Patent No.: US 9,785,381 B2
(45) Date of Patent: Oct. 10, 2017

(54) COMPUTER SYSTEM AND CONTROL METHOD FOR THE SAME

(71) Applicant: Hitachi, Ltd., Tokyo (JP)

(72) Inventors: Kenta Shiga, Yokohama (JP); Kazuyoshi Serizawa, Tama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/797,685

(22) Filed: Jul. 13, 2015

(65) Prior Publication Data
US 2015/0317101 A1    Nov. 5, 2015

Related U.S. Application Data

(63) Continuation of application No. 12/745,939, filed as application No. PCT/JP2010/003103 on Apr. 30, 2010, now abandoned.

(51) Int. Cl.
*G06F 15/167* (2006.01)
*G06F 3/06* (2006.01)

(52) U.S. Cl.
CPC .......... *G06F 3/0659* (2013.01); *G06F 3/0605* (2013.01); *G06F 3/067* (2013.01); *G06F 3/0608* (2013.01); *G06F 3/0629* (2013.01); *G06F 3/0647* (2013.01); *G06F 3/0662* (2013.01)

(58) Field of Classification Search
CPC .............................. G06F 3/0659; G06F 3/0608
USPC .................................................. 709/213, 214
See application file for complete search history.

(56) References Cited

U.S. PATENT DOCUMENTS

| 7,949,637 | B1 | 5/2011 | Burke |
| 2004/0111596 | A1 | 6/2004 | Rawson, III |
| 2006/0174087 | A1 | 8/2006 | Hashimoto et al. |
| 2008/0033375 | A1 | 2/2008 | Dallabetta |
| 2008/0162800 | A1 | 7/2008 | Takashige et al. |
| 2008/0183882 | A1* | 7/2008 | Flynn ............. G06F 1/183 709/229 |
| 2008/0222633 | A1 | 9/2008 | Kami |
| 2008/0307120 | A1 | 12/2008 | Ogawa et al. |
| 2009/0037680 | A1 | 2/2009 | Colbert et al. |

(Continued)

FOREIGN PATENT DOCUMENTS

| EP | 1962192 A1 | 8/2008 |
| JP | 2004-192612 A | 7/2004 |

(Continued)

OTHER PUBLICATIONS

C. Clark et al., Live Migration of Virtual Machines, NSDI '05: 2nd Symposium on Networked Systems Design & Implementation, Jan. 1, 2005, pp. 273-286.

(Continued)

*Primary Examiner* — Suraj Joshi
*Assistant Examiner* — Joel Mesa
(74) *Attorney, Agent, or Firm* — Mattingly & Malur, PC

(57) ABSTRACT

A computer system with a plurality of storage systems connected to each other via a network, each storage system including a virtual machine whose data is stored in hierarchized storage areas. When a virtual machine of a first storage system is migrated from the first storage system to a second storage system, the second storage system stores data of the virtual machine of the first storage system as well as data of its own virtual machine, in the hierarchized storage areas in the second storage system.

9 Claims, 36 Drawing Sheets

(56) References Cited

U.S. PATENT DOCUMENTS

| | | | |
|---|---|---|---|
| 2009/0144389 A1 | 6/2009 | Sakuta | |
| 2009/0235250 A1 | 9/2009 | Takai | |
| 2009/0254719 A1 | 10/2009 | Sasage | |
| 2010/0070725 A1 | 3/2010 | Prahlad et al. | |
| 2011/0119427 A1 | 5/2011 | Dow et al. | |
| 2012/0030306 A1 | 2/2012 | Kami | |
| 2012/0179771 A1* | 7/2012 | Ganti | G06F 11/1425 709/213 |

FOREIGN PATENT DOCUMENTS

| | | |
|---|---|---|
| JP | 2006-072591 A | 3/2006 |
| JP | 2006-209487 A | 8/2006 |
| JP | 2008-146566 A | 6/2008 |
| JP | 2008-225546 A | 9/2008 |
| JP | 2008-305288 A | 12/2008 |
| JP | 2009-140053 A | 6/2009 |
| JP | 2009-223497 A | 10/2009 |
| JP | 2009-251751 A | 10/2009 |

OTHER PUBLICATIONS

Japanese Office Action dated May 27, 2014 for Japanese Patent Application No. 2012-532188 corresponding to this application.
Japanese Office Action received in corresponding Japanese Application No. 2015-005721 dated Nov. 17, 2015.
Japanese Office Action received in corresponding Japanese Application No. 2015-005721 dated Mar. 15, 2016.

* cited by examiner

DESTAGING IN MIGRATION SOURCE COMPUTER

VM TABLE

| VM ID | VIRTUAL WWN | EXTERNAL STORAGE APPARATUS ||
|---|---|---|---|
| | | ID | LUN |
| VM1 | 00000001 | ES1 | RL3 |
| ... | ... | ... | ... |
| 411 | 412 | 413 | 414 |
| VM ID | VIRTUAL WWN | EXTERNAL STORAGE APPARATUS ||
| | | ID | LUN |
| VM2 | 00000002 | ES1 | RL4 |
| ... | ... | ... | ... |

VIRTUAL LU TABLE

| VIRTUAL LUN | VIRTUAL WWN | VIRTUAL CAPACITY |
|---|---|---|
| VL1 | 00000001 | 40GB |
| ... | ... | ... |

42a 421　422　423

| VIRTUAL LUN | VIRTUAL WWN | VIRTUAL CAPACITY |
|---|---|---|
| VL2 | 00000002 | 80G |
| ... | ... | ... |

EXTERNAL STORAGE TABLE

| STORAGE ID | WWN |
|---|---|
| ES1 | 00000011 |
| ... | ... |

MAPPING TABLE 44a

| VIRTUAL LUN | VIRTUAL PAGE ID | ACCESS FREQUENCY | ASSIGNED PAGE | | |
| --- | --- | --- | --- | --- | --- |
| | | | STORAGE APPARATUS ID | LUN | PAGE ID |
| VL1 | VP11 | 300 | DS1 | RL1 | RP11 |
| VL1 | VP12 | 100 | DS1 | RL1 | RP12 |
| VL1 | VP13 | 10 | ES1 | RL3 | RP31 |
| ... | ... | ... | ... | ... | ... |

441  442  443  444  445  446

44b

| VIRTUAL LUN | VIRTUAL PAGE ID | ACCESS FREQUENCY | ASSIGNED PAGE | | |
| --- | --- | --- | --- | --- | --- |
| | | | STORAGE APPARATUS ID | LUN | PAGE ID |
| VL2 | VP21 | 200 | DS2 | RL2 | RP21 |
| VL2 | VP22 | 0 | N/A | N/A | N/A |
| ... | ... | ... | ... | ... | ... |

FIG. 8B

DIRECT-ATTACHED STORAGE APPARATUS PAGE TABLE 45a

| STORAGE ID | LUN | PAGE ID | STATUS |
| --- | --- | --- | --- |
| DS1 | RL1 | RP11 | Assigned |
| DS1 | RL1 | RP12 | Assigned |
| ... | ... | ... | ... |

451  452  453  454

45b

| STORAGE ID | LUN | PAGE ID | STATUS |
| --- | --- | --- | --- |
| DS2 | RL2 | RP21 | Assigned |
| DS2 | RL2 | RP22 | Not Assigned |
| ... | ... | ... | ... |

FIG.9

EXTERNAL STORAGE PAGE TABLE  ~46a

| STORAGE ID | LUN | PAGE ID | STATUS |
|---|---|---|---|
| ES1 | RL3 | RP31 | Assigned |
| ES1 | RL3 | RP32 | Not Assigned |
| ... | ... | ... | ... |

461  462  463  464

~46b

| STORAGE ID | LUN | PAGE ID | STATUS |
|---|---|---|---|
| ES1 | RL4 | RP41 | Not Assigned |
| ... | ... | ... | ... |

FIG.10A

COMPUTER TABLE  ~61

| COMPUTER ID | IP ADDRESS | WWN |
|---|---|---|
| SV1 | 192.168.0.1 | 00000021 |
| SV2 | 192.168.0.2 | 00000022 |
| ... | ... | ... |

VM TABLE  ~62

| VM ID | COMPUTER ID |
|---|---|
| VM1 | SV1 |
| VM2 | SV2 |
| ... | ... |

621  622

FIG.10C
EXTERNAL STORAGE TABLE  /63

| STORAGE ID | IP ADDRESS | WWN |
|---|---|---|
| ES1 | 192.168.1.1 | 00000011 |
| ... | ... | ... |

631  632  633

FIG.11A
COMPUTER ADDITION SCREEN  /1100

| COMPUTER ADDITION SCREEN |
|---|

COMPUTER ID  [ ] /1101
IP ADDRESS  [ ] /1102
WWN  [ ] /1103
DIRECT-ATTACHED STORAGE APPARATUS ID  [ ] /1104
LUN  [ ] /1105
CAPACITY  [ ] /1106

[ OK ]   [ Cancel ]
 1107      1108

FIG.11B
EXTERNAL STORAGE APPARATUS ADDITION SCREEN

- 1110 EXTERNAL STORAGE APPARATUS ADDITION SCREEN
- 1111 STORAGE ID
- 1112 IP ADDRESS
- 1113 WWN
- 1114 OK
- 1115 Cancel

FIG.12

- 1200 VM ADDITION SCREEN
- 1201 COMPUTER ID: SV1
- 1202 VM ID
- 1203 COMPUTER ID
- 1204 VIRTUAL LUN
- 1205 VIRTUAL CAPACITY: GB
- 1206 EXTERNAL STORAGE APPARATUS ID: ES1
- 1207 LUN
- 1208 CAPACITY: GB
- 1209 OK
- 1210 Cancel

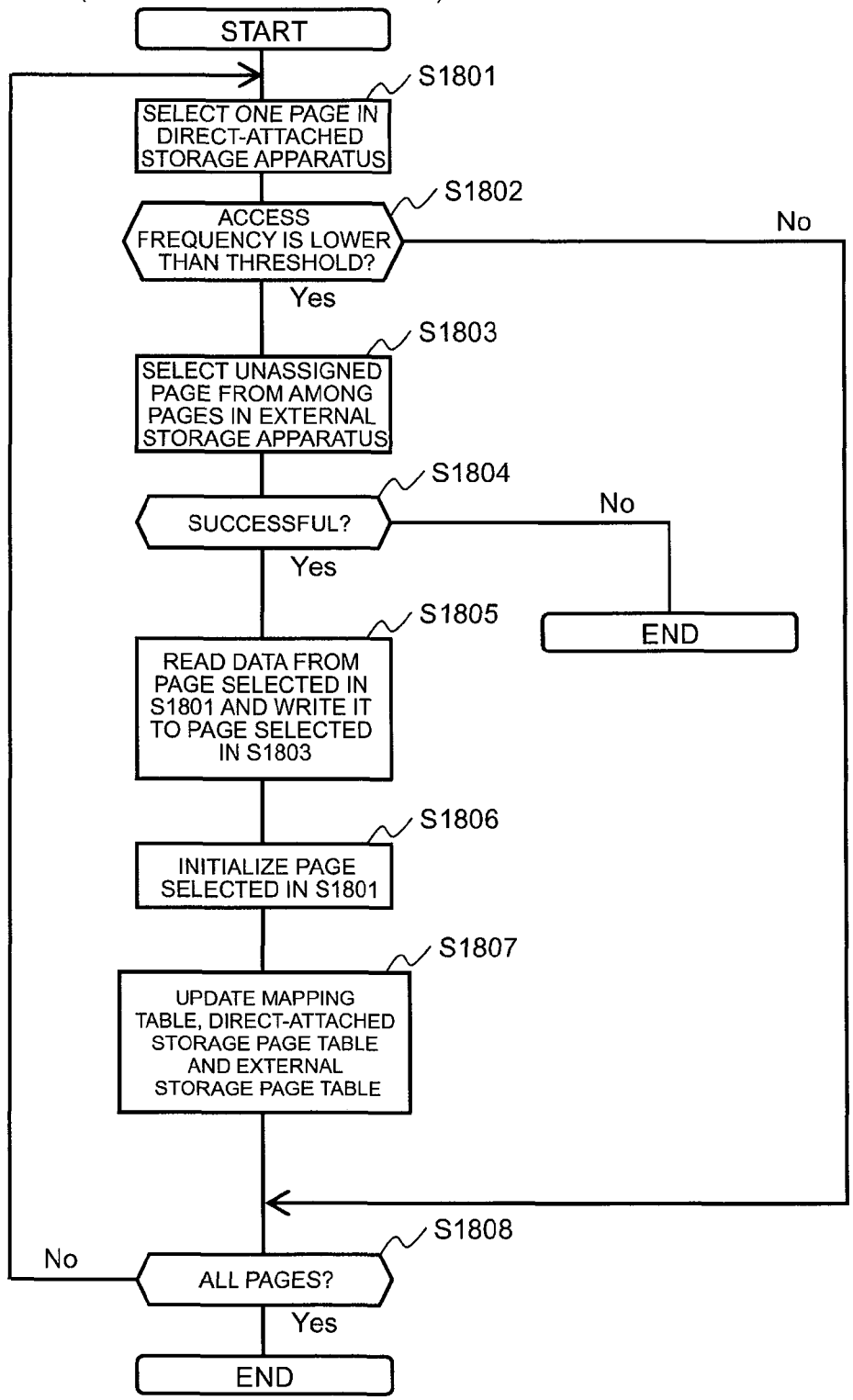

FIG.21A

MIGRATION DESTINATION
DETERMINATION TABLE

| VIRTUAL LUN | VIRTUAL PAGE ID | ACCESS FREQUENCY | MIGRATION SOURCE STORAGE ID | MIGRATION DESTINATION STORAGE ID |
|---|---|---|---|---|
| VL1 | VP11 | 300 | DS1 | DS2 |
| VL2 | VP21 | 200 | DS2 | ES1 |
| VL1 | VP12 | 100 | DS1 | ES1 |
| VL1 | VP13 | 10 | ES1 | ES1 |
| ... | ... | ... | ... | ... |
| 471 | 472 | 473 | 474 | 475 |

FIG.21B

STATUS TABLE

| VM ID | STATUS |
|---|---|
| VM1 | VM IS BEING MIGRATED |
| ... | ... |
| 641 | 642 |

FIG.22A
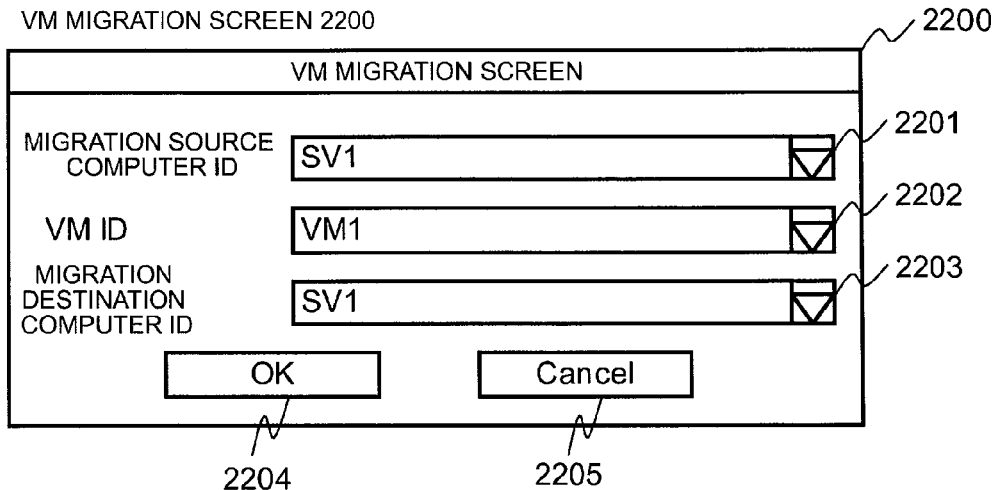
FIG.22B
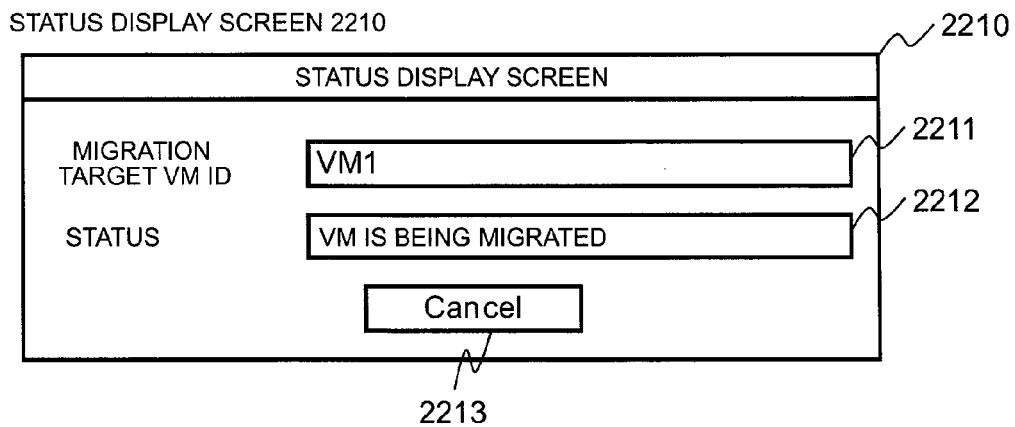
FIG.23A

FIG.23B

42 VIRTUAL LU TABLE

| VIRTUAL LUN | VIRTUAL WWN | VIRTUAL CAPACITY |
|---|---|---|
| VL2 | 00000002 | 80G |
| VL1 | 00000001 | 40GB |
| ... | ... | ... |

44 MAPPING TABLE

| VIRTUAL LUN | VIRTUAL PAGE ID | ACCESS FREQUENCY | ASSIGNED PAGE | | |
|---|---|---|---|---|---|
| | | | STORAGE ID | LUN | PAGE ID |
| VL2 | VP21 | 200 | DS2 | RL2 | RP21 |
| VL2 | VP22 | 0 | N/A | N/A | N/A |
| VL1 | VP11 | 300 | DS1 | RL1 | RP11 |
| VL1 | VP12 | 100 | DS1 | RL1 | RP12 |
| VL1 | VP13 | 10 | ES1 | RL3 | RP31 |
| ... | ... | ... | ... | ... | ... |

46 EXTERNAL STORAGE PAGE TABLE

| STORAGE ID | LUN | PAGE ID | STATUS |
|---|---|---|---|
| ES1 | RL4 | RP41 | Not Assigned |
| ES1 | RL3 | RP31 | Assigned |
| ES1 | RL3 | RP32 | Not Assigned |
| ... | ... | ... | ... |

MAPPING TABLE 44b

| VIRTUAL LUN | VIRTUAL PAGE ID | ACCESS FREQUENCY | ASSIGNED PAGE | | |
|---|---|---|---|---|---|
| | | | STORAGE ID | LUN | PAGE ID |
| VL2 | VP21 | 200 | ES1 | RL4 | RP41 |
| VL2 | VP22 | 0 | N/A | N/A | N/A |
| VL1 | VP11 | 300 | DS1 | RL1 | RP11 |
| VL1 | VP12 | 100 | DS1 | RL1 | RP12 |
| VL1 | VP13 | 10 | ES1 | RL3 | RP31 |
| ... | ... | ... | ... | ... | ... |

DIRECT-ATTACHED STORAGE PAGE TABLE 45b

| STORAGE ID | LUN | PAGE ID | STATUS |
|---|---|---|---|
| DS2 | RL2 | RP21 | Reserved |
| DS2 | RL2 | RP22 | Not Assigned |
| ... | ... | ... | ... |

EXTERNAL STORAGE PAGE TABLE 46b

| STORAGE ID | LUN | PAGE ID | STATUS |
|---|---|---|---|
| ES1 | RL4 | RP41 | Assigned |
| ES1 | RL3 | RP31 | Assigned |
| ES1 | RL3 | RP32 | Not Assigned |
| ... | ... | ... | ... |

MAPPING TABLE

| VIRTUAL LUN | VIRTUAL PAGE ID | ACCESS FREQUENCY | ASSIGNED PAGE | | |
|---|---|---|---|---|---|
| | | | STORAGE ID | LUN | PAGE ID |
| VL2 | VP21 | 200 | ES1 | RL4 | RP41 |
| VL2 | VP22 | 0 | N/A | N/A | N/A |
| VL1 | VP11 | 300 | DS2 | RL2 | RP21 |
| VL1 | VP12 | 100 | DS1 | RL1 | RP12 |
| VL1 | VP13 | 10 | ES1 | RL3 | RP31 |
| ... | ... | ... | ... | ... | ... |

DIRECT-ATTACHED STORAGE PAGE TABLE

| STORAGE ID | LUN | PAGE ID | STATUS |
|---|---|---|---|
| DS1 | RL1 | RP11 | Not Assigned |
| DS1 | RL1 | RP12 | Assigned |
| ... | ... | ... | ... |

45a / 4503a

| STORAGE ID | LUN | PAGE ID | STATUS |
|---|---|---|---|
| DS2 | RL2 | RP21 | Assigned |
| DS2 | RL2 | RP22 | Not Assigned |
| ... | ... | ... | ... |

MAPPING TABLE

44b

| VIRTUAL LUN | VIRTUAL PAGE ID | ACCESS FREQUENCY | ASSIGNED PAGE | | |
|---|---|---|---|---|---|
| | | | STORAGE ID | LUN | PAGE ID |
| VL2 | VP21 | 200 | ES1 | RL4 | RP41 |
| VL2 | VP22 | 0 | N/A | N/A | N/A |
| VL1 | VP11 | 300 | DS2 | RL2 | RP21 |
| VL1 | VP12 | 100 | ES1 | RL3 | RP32 |
| VL1 | VP13 | 10 | ES1 | RL3 | RP31 |
| ... | ... | ... | ... | ... | ... |

DIRECT-ATTACHED STORAGE PAGE TABLE

45a

| STORAGE ID | LUN | PAGE ID | STATUS |
|---|---|---|---|
| DS1 | RL1 | RP11 | Not Assigned |
| DS1 | RL1 | RP12 | Not Assigned |
| ... | ... | ... | ... |

EXTERNAL STORAGE PAGE TABLE

46b

| STORAGE ID | LUN | PAGE ID | STATUS |
|---|---|---|---|
| ES1 | RL4 | RP41 | Assigned |
| ES1 | RL3 | RP31 | Assigned |
| ES1 | RL3 | RP32 | Assigned |
| ... | ... | ... | ... |

| VIRTUAL LUN | VIRTUAL WWN | VIRTUAL CAPACITY | VM USE AREA |
|---|---|---|---|
| VL1 | 00000001 | 1GB | 0~2097151 |
| ... | ... | ... | ... |

42a 421, 422, 423, 424

| VIRTUAL LUN | VIRTUAL WWN | VIRTUAL CAPACITY | VM USE AREA |
|---|---|---|---|
| VL2 | 00000002 | 1GB | 0~2097151 |
| ... | ... | ... | ... |

42b

COMPUTER SYSTEM AND CONTROL METHOD FOR THE SAME

CROSS-REFERENCE TO RELATED APPLICATION

This application is a continuation application of U.S. application Ser. No. 12/745,939, filed Jun. 3, 2010, which is a 371 of International Application No. JP2010/003103, filed Apr. 30, 2010, the entirety of the contents and subject matter of all of the above is incorporated herein by reference.

TECHNICAL FIELD

This invention relates to a computer system. Particularly, the invention relates to a computer system using a computer virtualization technology and a storage hierarchization technology, and also relates to a data storage control method for the above-described computer system.

BACKGROUND ART

One of solutions based on the concept of information life cycle management is a storage hierarchization technology. This technology is to classify storage units where information is to be stored according to tiers based on the performance, cost, and reliability in accordance with utility value of the information. For example, storage units are generally hierarchized into three tiers, that is, Tier 1, Tier 2, and Tier 3.

Tier 1 is a storage unit for storing information about the highest information value, which is created and currently utilized. A Fibre Channel storage unit which demonstrates high-performance and is highly reliable is used as Tier 1. Tier 1 is also called an online storage unit.

Tier 2 is used to store data which is no longer utilized but is searched and referred to for reuse. A high-capacity, low-cost storage unit such as an ATA storage unit or an SATA storage unit is used as Tier 2.

Tier 3 is a storage unit specialized for storing data which is seldom accessed, and a tape drive whose cost per capacity is low is used. Tier 3 is also called an offline storage unit, and Tier 2, which ranks between Tier 1 and Tier 3, is called a nearline storage. An example of a conventional technique related to this invention is Japanese Unexamined Patent Application Publication No. 2008-305288.

CITATION LIST

Patent Literature

[PTL 1]
Japanese Unexamined Patent Application Publication No. 2008-305288

SUMMARY OF INVENTION

Technical Problem

In view of further prioritizing the performance of storage units, recently, a tier called Tier 0 is also proposed. A representative example of Tier 0 is flash memory. Meanwhile, since the bit cost of flash memory has been decreasing these days, the conventional storage hierarchization technology has also been changing and there is also a tendency for polarization in use of storage units into Tier 0 and Tier 2.

Therefore, regarding a computer system in which multiple computers are connected to a network, directly connecting Tier 0 storage units to the computers, storing online data of each computer in a dedicated Tier 0 storage unit, connecting a NAS including a Tier 2 storage units to the network, and storing nearline data of each computer to Tier 2 storage units is proposed.

Meanwhile, a virtualization technology of virtualizing computer resources and setting multiple virtual machines (Virtual Machines [VMs]) in computers is becoming widespread. A VM is sometimes migrated between computers for the purpose of, for example, well-planned maintenance of the computers, CPU load balancing for the computers, and reduction of power consumption by the computers.

If the above-mentioned storage hierarchization control is applied to a computer system in which multiple computers having a virtualization function are connected via a network, when a VM is migrated between the multiple computers, there is a possibility that, due to disturbance in the uniformity of the storage hierarchization control for the multiple computers, the quality of data management in the computer system might be deteriorated. For example, the VM after migration may fail to access pre-migration data immediately and thereby fail to operate normally.

Therefore, it is an object of this invention to provide a computer system in which multiple computers having a virtualization function are connected via a network and to which storage hierarchization control is applied, wherein even if a VM is migrated between the computers, the quality of storage hierarchization control for the plurality of computers is maintained and data management in the computer system is improved; and a data storage control method for such a computer system.

Solution to Problem

This invention provides a computer system including a plurality of storage systems, each of which has a VM and whose data is stored in hierarchized storage areas, and a network connecting the plurality of storage systems to each other, in order to achieve the above-described object. When a VM is migrated from a certain storage system to another storage system, the migration destination storage system stores data of the VM of the migration source storage system, as well as data of its own VM, in hierarchized storage areas of the migration destination storage system.

Advantageous Effects of Invention

According to this invention, it is possible to provide a computer system in which a plurality of computers having the virtualization function are connected via the network and to which storage hierarchization control is applied, wherein even if a VM is migrated between the computers, the quality of storage hierarchization control for the plurality of computers is maintained and data management in the computer system is improved; and a data storage control method for such a computer system.

BRIEF DESCRIPTION OF DRAWINGS

FIG. 7B is a virtual LU table for specifying management and control information about virtual LUs.

FIG. 7C is an external storage table showing characteristics of external storage apparatuses.

FIG. 8A shows a data configuration example for a mapping table for specifying management and control information for converting (mapping) access from a VM to a virtual LU into access to a direct-attached storage apparatus or an external storage apparatus.

FIG. 8B is a direct-attached storage page table for specifying management and control information about direct-attached storage apparatuses.

FIG. 9 is an external storage page table for specifying management and control information about real pages in external storage apparatuses.

FIG. 10A is a computer table for specifying management and control information about computers.

FIG. 10B is a VM table for specifying management and control information about VMs.

FIG. 10C is an external storage table for specifying management and control information about external storage apparatuses.

FIG. 11A is an example of a GUI for adding a computer to the computer system.

FIG. 11B is an example of a GUI related to an external storage apparatus addition screen.

FIG. 12 is an example of a GUI for adding a VM to the computer.

FIG. 18 is a flowchart illustrating a first form of processing executed by the computer for migrating data between storage tiers.

FIG. 21A is a migration destination determination table in a migration destination computer to which a VM is migrated.

FIG. 21B is a table relating to the VM status.

FIG. 22A is an example of a VM migration screen in the management terminal.

FIG. 22B is an example of a VM status display screen in the management terminal.

FIG. 23A is a VM table updated in a VM migration destination computer.

FIG. 23B is a virtual LU table updated in the VM migration destination computer.

FIG. 23C is a mapping table updated in the VM migration destination computer.

FIG. 23D is an external storage page table updated in the VM migration destination computer.

FIG. 24A is a mapping table after destaging processing in the VM migration destination computer is completed.

FIG. 24B is a direct-attached storage table after the destaging processing in the VM migration destination computer is completed.

FIG. 24C is an external storage page table after the destaging processing in the VM migration destination computer is completed.

FIG. 25A shows mapping table after the migration processing between direct-attached storage apparatuses is completed.

FIG. 25B shows a direct-attached tables after the migration processing between direct-attached storage apparatuses is completed.

FIG. 26A is a mapping table after the destaging processing in FIG. 30 is completed.

FIG. 26B is a direct-attached storage table after the destaging processing in FIG. 30 is completed.

FIG. 26C is an external storage table after the destaging processing in FIG. 30 is completed.

FIG. 36 is a another example of a virtual LU table for specifying management and control information about virtual LUs

REFERENCE SIGNS LIST

1 Computer
2 Direct-attached storage
3 External storage apparatus

4 Management terminal
5 Network

DESCRIPTION OF EMBODIMENTS

Figure 1:
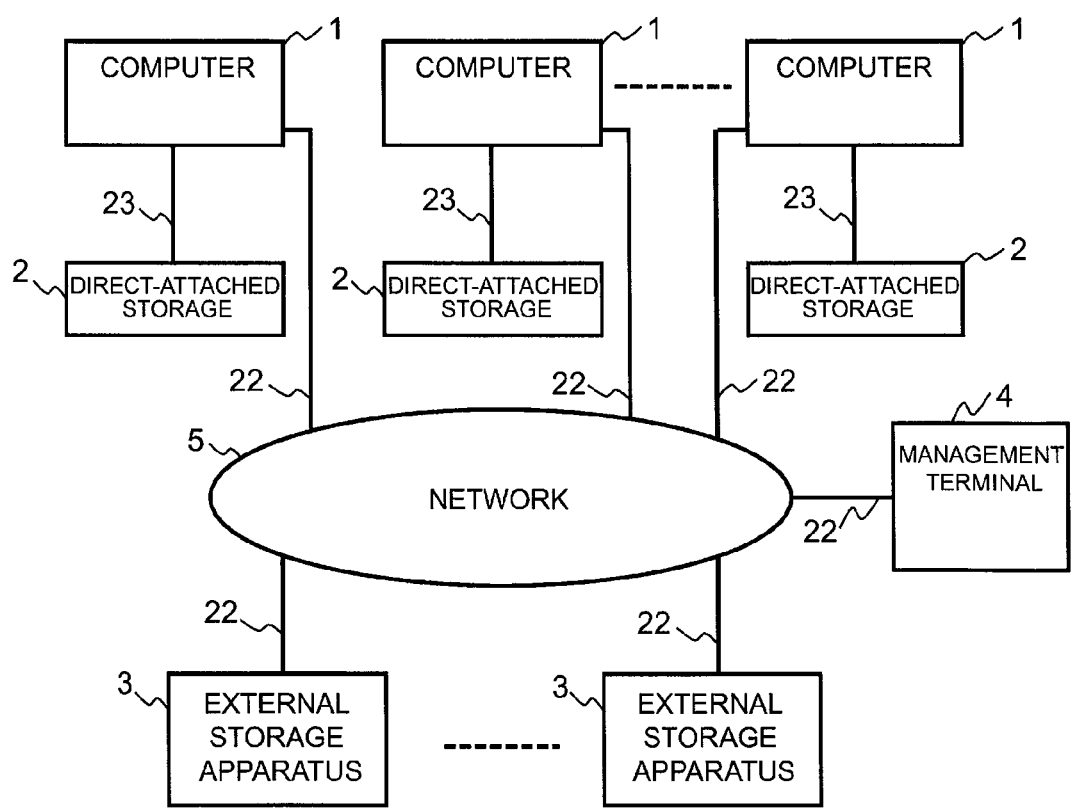
FIG. 1 is a hardware block diagram of a computer system according to the first embodiment.

Next, embodiments of this invention will be described below with reference to the attached drawings. FIG. 1 is a hardware block diagram showing a computer system according to the first embodiment. This system includes computers 1, direct-attached storage apparatuses 2 directly connected to the computers 1, external storage apparatuses 3, a management terminal (or management computer) 4 for an administrator to manage the direct-attached storage apparatuses 2 and the external storage apparatuses 3, and a network 5 for connecting the computers 1, the external storage apparatuses 3, and the management terminal 4 to each other. A storage system in each site is constituted from the computer 1 and the storage apparatus 2 directly connected thereto.

The computers 1, the external storage apparatuses 3, and the management terminal 4 are connected to the network 5 via communication lines 22 such as copper cables or optical fiber cables. The computers 1 and the direct-attached storage apparatuses 2 are connected via communication lines 23 such as copper cables or optical fiber cables.

A storage control program (described later) of the computer 1 sets a logical volume (LU: Logical Unit) for a VM to access a logical storage area of the direct-attached storage apparatus 2 and the external storage apparatus 3. As described later, this logical volume is a virtual volume whose capacity is virtualized, that is, which does not have any real capacity. Storage resources are allocated from the direct-attached storage apparatus 2 or the external storage apparatus 3 to the above-described virtual volume, for example, by means of Thin Provisioning.

The direct-attached storage apparatus 2 is equivalent to Tier 0 and includes one or more high-speed, high-performance, and highly-reliable storage media such as SSDs (Solid State Drives). However, the description above does not preclude the use of the direct-attached storage apparatus 2 as Tier 1.

The external storage apparatus 3 is equivalent to Tier 2 and includes one or more low-speed, low-cost storage media such as SAS or SATA hard disk drives. However, if the direct-attached storage apparatus 2 is Tier 0, the external storage apparatus may be Tier 1. It is preferable that the direct-attached storage apparatus 2 and the external storage apparatus 3 are configured according to RAID, but other configurations may also be permitted.

The network 5 may be wired or wireless. If the network 5 is wireless, the communication lines 22 are not required. Furthermore, the network 5 may be an Ethernet, an IP (Internet Protocol) network, an FC (Fibre Channel) network, or other networks. Furthermore, a management network for connecting the management terminal 4, the computers 1, and the external storage apparatuses 3 to each other may also be used separately from the network 5.

Figure 2:
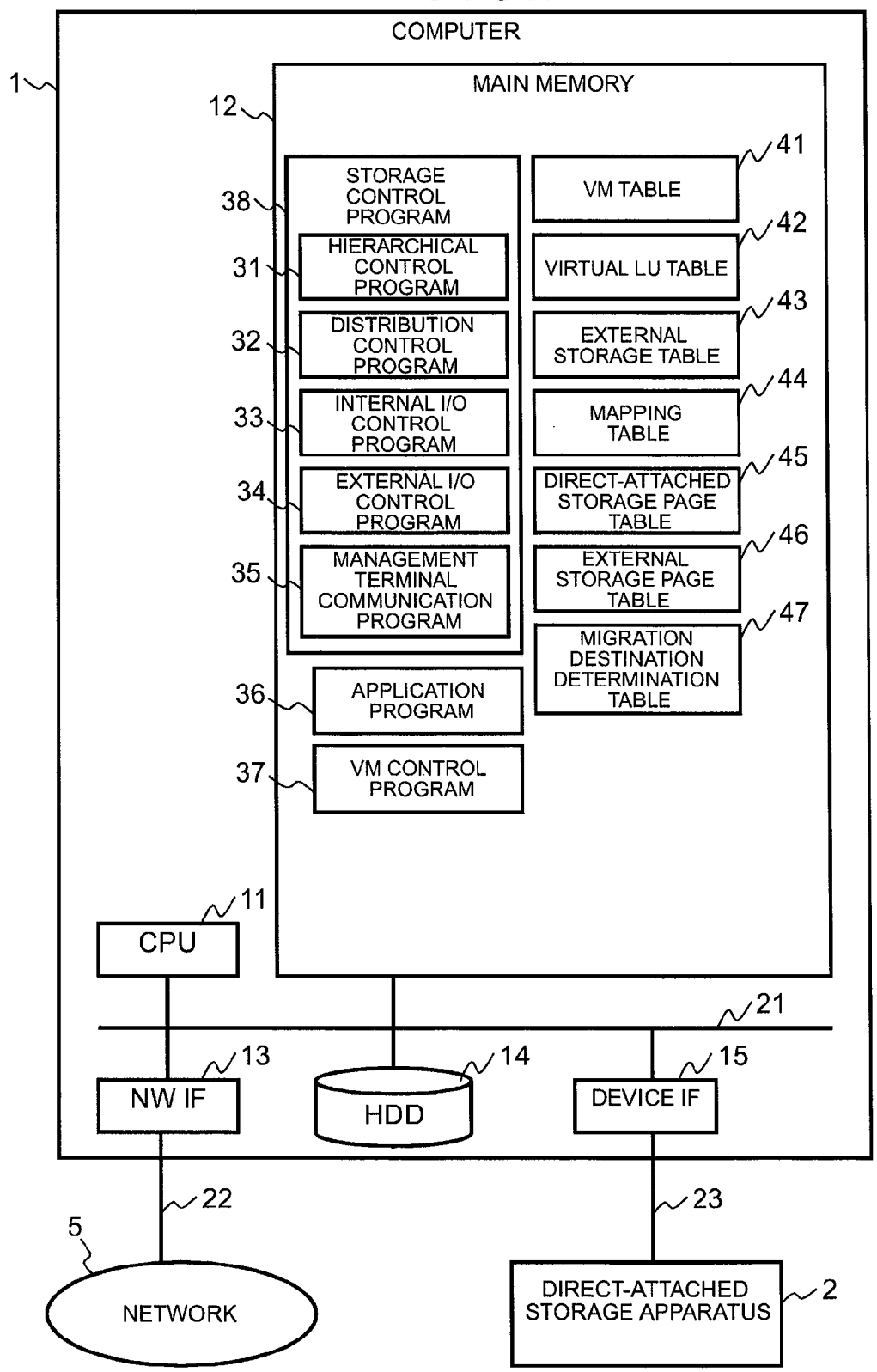
FIG. 2 is a hardware block diagram showing the details of a computer.

FIG. 2 is a hardware block diagram of the computer 1. The computer 1 comprises an arithmetic unit (CPU) 11, a volatile main memory 12, a network interface (NW IF) 13 connecting the computer 1 and a communication line 22, a nonvolatile storage device 14 such as an HDD, a device interface (device IF) 15 connecting the computer 1 and a communication line 23, and a communication line 21 such as a bus mutually connecting the CPU 11, the main memory 12, the NW IF 13, the HDD 14, and the device IF 15.

The HDD 14 stores programs and information tables, and the CPU 11 mounts the programs and information tables from the HDD 14 to the main memory 12 and, for example, executes the programs and refers to the tables. FIG. 2 shows the programs and tables stored in the main memory 12.

A storage control program 38 for controlling storage apparatuses is constituted from a hierarchical control program 31, a distribution control program 32, an internal I/O control program 33, an external I/O control program 34, and a management terminal communication program 35. The main memory 12 further includes an application program 36 including the OS, and a VM control program 37.

The storage control program 38 has been conventionally executed in the direct-attached storage apparatus 2 or in the external storage apparatus 3; however, the computer 1 has its own arithmetic unit 11 execute the storage control program 38 as well as the application program 36, thereby enabling Hierarchical Storage Management between the direct-attached storage apparatus 2 directly connected to the computer 1 and the external storage apparatus 3 connected via the network 5.

The overview of operations of the application program 36, the VM control program 37, and the storage control program 38 will be described below. The CPU 11 for each computer can set one or more VMs, which are virtual computers, in the computer by executing the VM control program 37. Then, the CPU 11 executes the application program 36 according to the VM control program 37 by setting the VMs as an execution subject. Since control resources for the computer are virtualized, the VM control program 37 can migrate VMs between multiple computers.

The VM control program 37 provides the above-mentioned virtual volumes to the VMs. These virtual volumes will be referred to as virtual LUs as described later. When the CPU 11 accesses a virtual LU according to the application program 36 and writes data to the virtual LU, the CPU 11 saves the data and the address of the data to the main memory 12 according to the VM control program 37, and then the CPU 11 transfers the data from the main memory 12 to the direct-attached storage apparatus 2 or the external storage apparatus 3 which corresponds to the virtual LU, according to the storage control program 38.

Meanwhile, when the CPU 11 reads data from a virtual LU according to the application program 36, the CPU 11 saves the address of the data to the main memory 12 according to the VM control program 37 and then the CPU 11 transfers the data from the address of the direct-attached storage apparatus 2 or the external storage apparatus 3 to the main memory 12 according to the storage control program 38.

Figure 3:
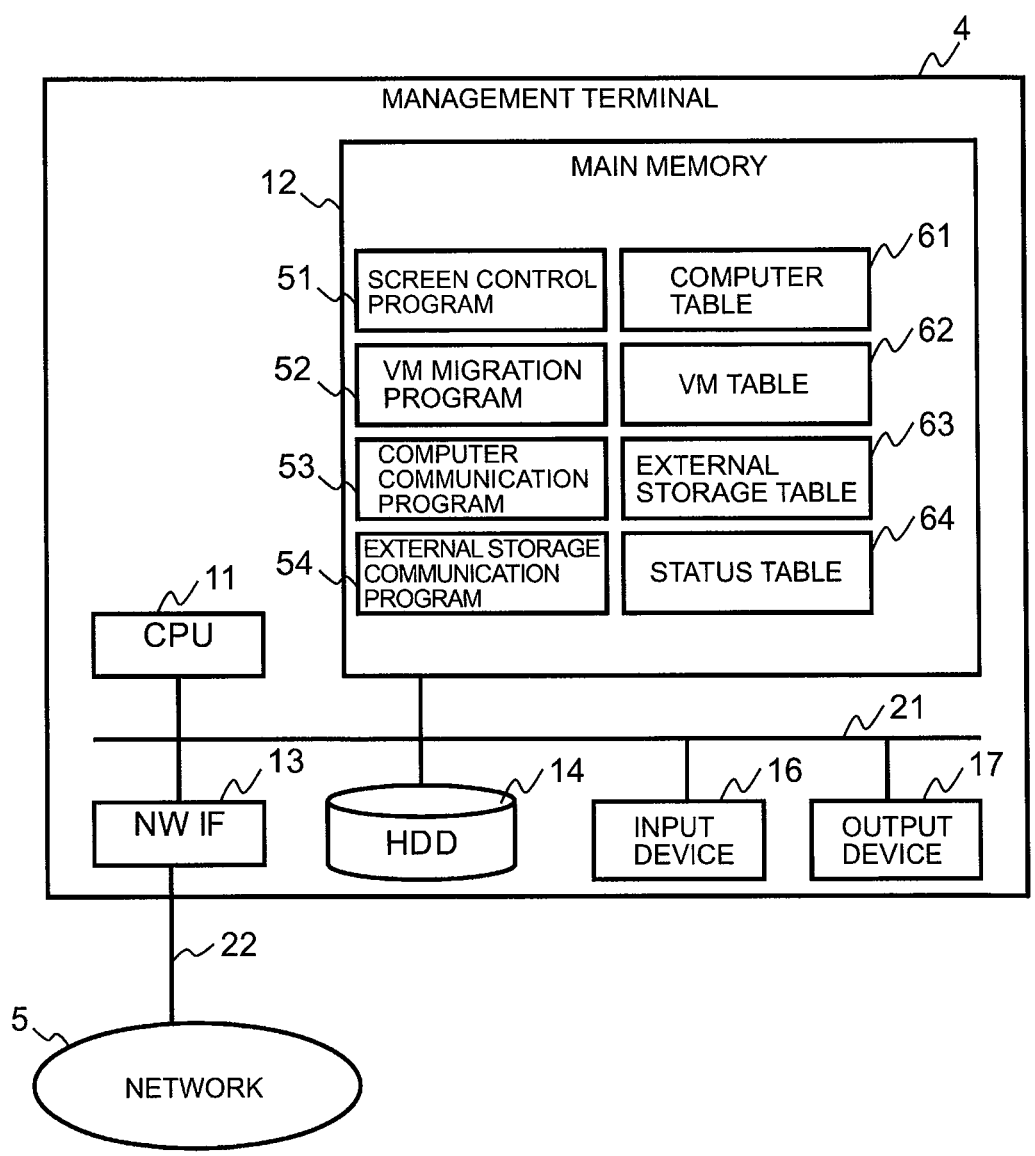
FIG. 3 is a hardware block diagram showing the details of a management terminal.

The HDD 14 stores various types of management tables such as a VM table 41, a virtual LU table 42, an external storage table 43, a mapping table 44, a direct-attached storage page table 45, an external storage page table 46, and a migration destination determination table 47. The details of the respective tables will be described later. FIG. 3 is a hardware block diagram of the management terminal 4. The management terminal 4 includes a CPU 11, a main memory 12, a NW IF 13, an HDD 14, an input device 16 such as a mouse and a keyboard, an output device 17 such as a display, and a communication line 21.

The HDD 14 stores programs such as a screen control program 51, a VM migration program 52, a computer communication program 53, and an external storage communication program 54. Furthermore, the HDD 14 stores tables such as a computer table 61, a VM table 62, an external storage table 63, and a status table 64.

The CPU 11 duplicates these programs from the HDD 14A to the main memory 21 and executes them. The CPU 11 further duplicates the tables from the HDD 14A to the main memory 12 and refers to them. Furthermore, the tables in the main memory 12 are rewritten by the CPU 11 and duplicated to the HDD 14.

In the description below, reference signs indicating components of the hardware are distinguished from each other by adding [a] to a reference sign indicating a component of a VM migration source computer, adding [b] to a reference sign indicating a component of a VM migration destination computer, and adding [c] to a reference sign indicating a component of the management terminal. For example, a CPU 11a belongs to the VM migration source computer, a CPU 11b belongs to the VM migration destination computer, and a CPU 11c belongs to the management terminal.

Figure 4A:
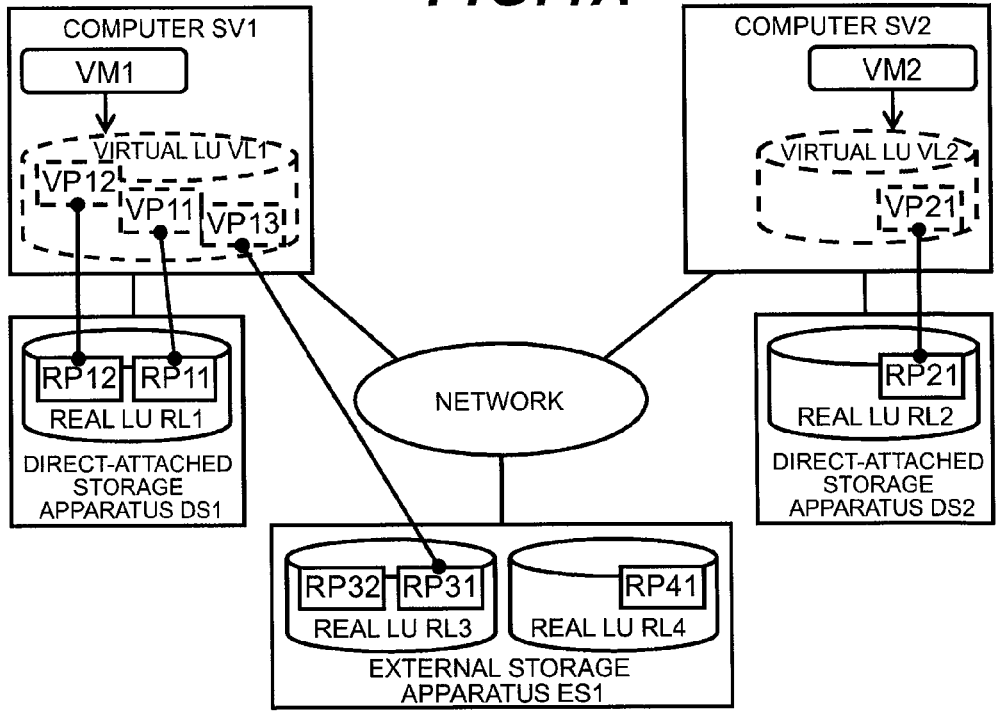
FIG. 4A is a block diagram of the computer system showing the status before VMs are migrated between the multiple computers.

Next, the operations of VM migration between multiple computers, virtual LU migration accompanied by VM migration, and data migration will be described. FIG. 4A is a block diagram of the computer system showing the state before VMs are migrated between the multiple computers. A computer whose ID is SV1 is connected to a direct-attached storage apparatus whose ID is DS1. A VM whose ID is VM1 operates in the computer SV1. Furthermore, the computer SV1 sets a virtual LU whose ID is VL1, and the VM1 accesses the virtual LU (VL1). The virtual LU (VL1) is composed of one or more pages. A page is a unit of storage areas constituting an LU. Pages in a virtual volume do not have storage resources, but LU pages in a storage apparatus are assigned to pages in a virtual LU. A page in a virtual LU is called a virtual page. On the other hand, an LU of a storage apparatus have storage resources and is thereby called a real LU, and a page in a real LU is called a real page.

The virtual LU (LV1) includes at least three virtual pages whose IDs are VP11, VP12, and VP13. The direct-attached storage apparatus DS1 directly connected to the computer SV1 includes a real LU whose ID is RL1, and provides this real LU to the computer SV1. The real LU (RL1) includes at least two real pages whose IDs are RP11 and RP12. The real page RP11 is assigned to the virtual page VP11, and the real page RP12 is assigned to the virtual page VP12.

An external storage apparatus 3 whose ID is ES1 provides a real LU whose ID is RL3 to the computer SV1 via the network 5. The real LU (RL3) includes at least real pages whose IDs are RP31 and RP32. The frequency of access by the VM1 to the virtual page VP11 and the virtual page VP12 is assumed to be higher than the frequency of access to the virtual page VP13. Therefore, write data to the virtual page VP11 and the virtual page VP12 are respectively stored in the real pages RP11 and RP12 in the high-speed, high-performance direct-attached storage apparatus DS1. On the other hand, write data to the virtual page VP13 is stored in the real page RP31 of the real LU (RL3) in the low-speed, low-performance external storage apparatus ES1.

A storage apparatus whose ID is DS2 is directly connected to a computer whose ID is SV2. A VM whose ID is VM2 operates in the computer SV2. The VM2 accesses a virtual LU whose ID is VL2. The virtual LU (VL2) at least includes a virtual page whose ID is VP21. The direct-attached storage apparatus DS2 provides a real LU, whose ID is RL2, to the computer SV2. The real LU (RL2) at least includes a real page whose ID is RP21. Data for the virtual page VP21 is stored in the real page RP21. This is because the real page RP21 is assigned to the virtual page VP21. The access frequency of the virtual page VP21 is assumed to be higher than the access frequency of the virtual page VP12 and the virtual page VP13, but lower than the access frequency of the virtual page VP11.

The external storage apparatus ES1 further includes a real LU whose ID is RL4. The real LU (RL4) includes at least a real page whose ID is RP41. The real page RP41 is not assigned to any virtual page yet.

Figure 4B:
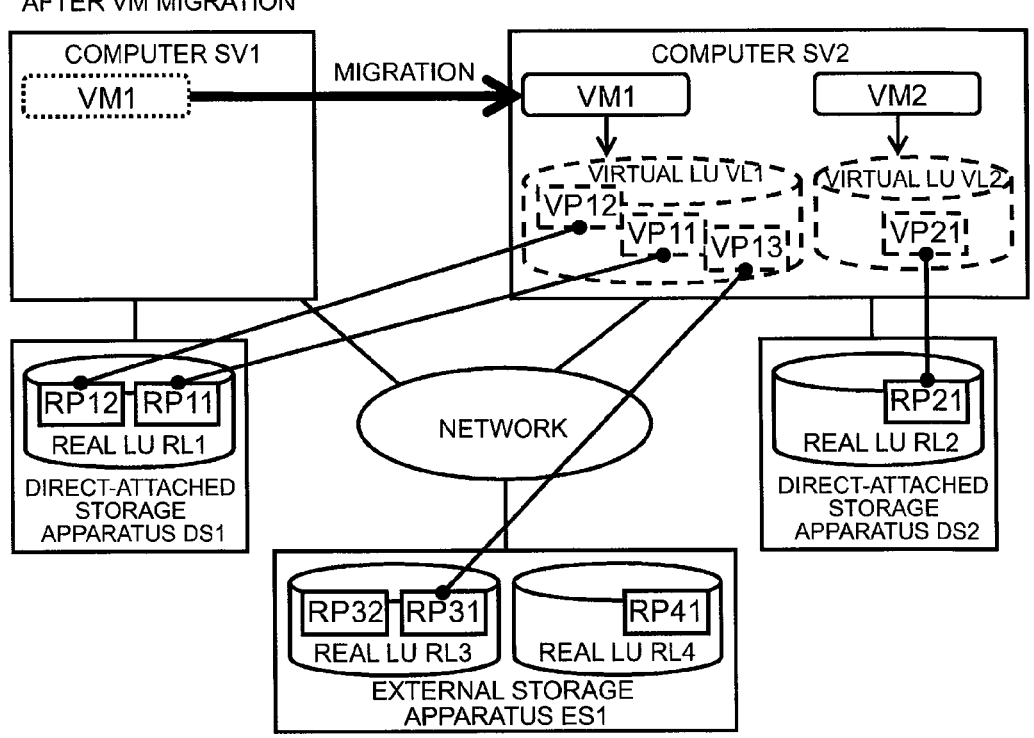
FIG. 4B is a block diagram of the computer system after VMs are migrated between the multiple computers.

FIG. 4B is a block diagram of the computer system after VMs are migrated between the multiple computers. If the administrator migrates the VM1 from the computer SV1 to the computer SV2 via the management terminal 4, this migration causes the virtual LU (VL1), the virtual pages VP11, VP12 of the virtual LU, and the VP13 to be migrated from the computer SV1 to the computer SV2. Therefore, the management and control information which is used by the VM to access the data assigned to the VM and existed in the computer SV1 before the VM migration, can be re-created in the computer SV2 which is the VM migration destination. Immediately after the VM is migrated, the correspondence relationship between the virtual pages and the real pages is the same as that before the migration.

Figure 5A:
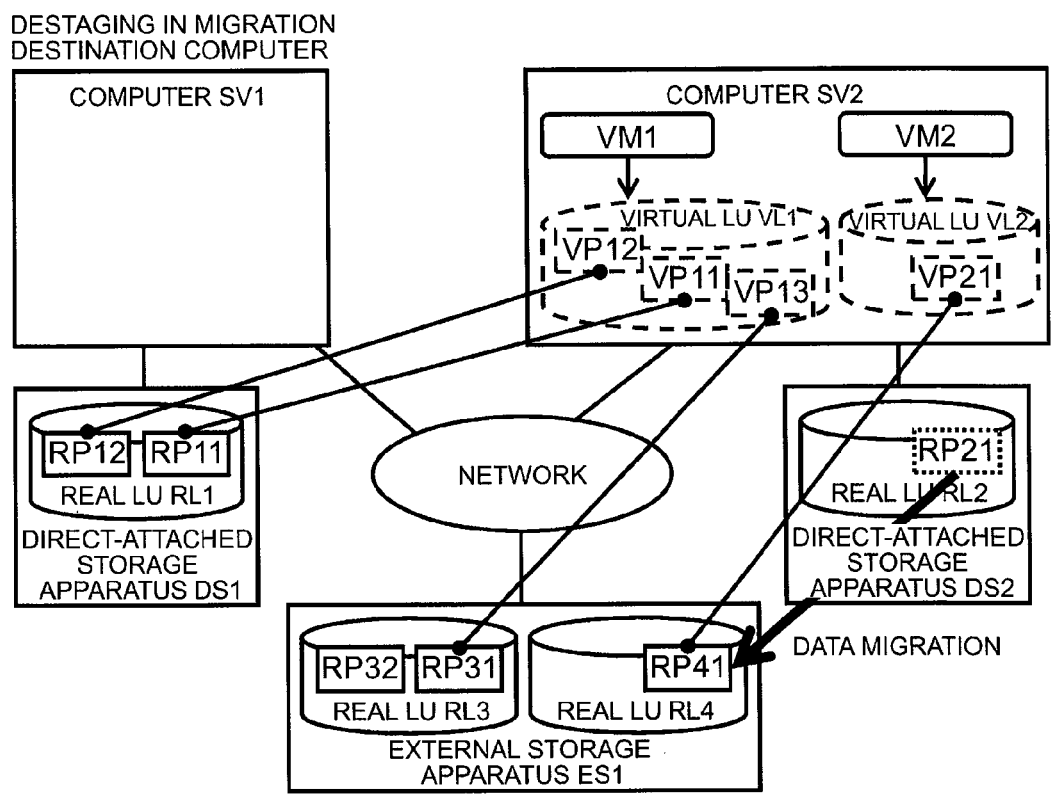
FIG. 5A is a block diagram of the computer system after destaging is performed in the migration destination computer.

Meanwhile, FIG. 5A shows a block diagram of the computer system after destaging is performed in the migration destination computer. Destaging means migration of data of the real pages in the direct-attached storage apparatus 2 to the real pages in the external storage apparatus 3. If the VM1 is migrated from the computer SV1 to the computer SV2 and attempts to access the virtual pages in the virtual LU (VL1), the VM1 must pass through the network 5 from the virtual computer SV2 and further access the real pages in the direct-attached storage apparatus DS1 from the computer SV1, thereby increasing latency. Particularly, the latency tends to increase more for the virtual page with higher access frequency (VP11). In order to avoid this latency, it is preferable that data in the virtual pages in the virtual LU (VL1), particularly in the virtual page VP11 whose frequency of access by the VM1 is high, exists in the real pages in the direct-attached storage apparatus DS2 for the computer SV2.

Therefore, since it is necessary to create free pages in direct-attached storage apparatus DS2 for the virtual page VP11, the management terminal 4 destages data in the real page RP21 assigned to the virtual page VP21, whose access frequency is lower than that of the virtual page VP11, from the direct-attached storage apparatus DS2 to the unused page RP41 of the real LU (RL4) in the external storage apparatus ES1. Then, the management terminal 4 firstly reassigns the real page RP41 to the virtual page VP21 and cancels the assignment of the virtual page VP21 to the real page RP21.

Figure 5B:
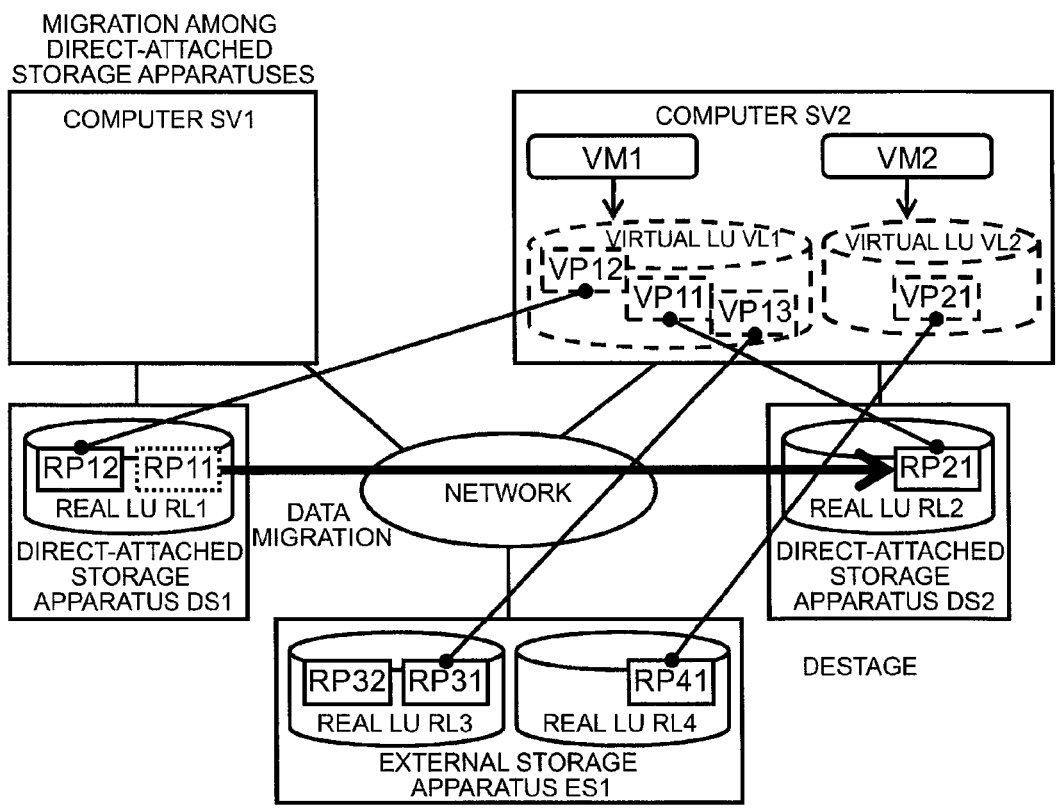
FIG. 5B is a block diagram of the computer system after data migration is performed between direct-attached storage apparatuses, each of which is directly connected to the computer, after VM migration.

FIG. 5B is a block diagram of the computer system after data of the real page RP11 in the direct-attached storage apparatus DS1 is directly migrated to the real page RP21 in the direct-attached storage apparatus DS2. As a free page (the real page RP21) is generated in the direct-attached storage apparatus DS2 by destaging, the management terminal 4 migrates data in the real page RP11 whose access frequency is high, from among the real pages in the direct-attached storage apparatus DS1 used by the VM1, to the real page RP21 in the direct-attached storage apparatus DS2. Then, the management terminal 4 cancels the assignment of the virtual page VP11 to the real page RP11 and then reassigns the virtual page VP11 to the real page RP21 in the direct-attached storage apparatus DS2.

Figures 6, 7A:
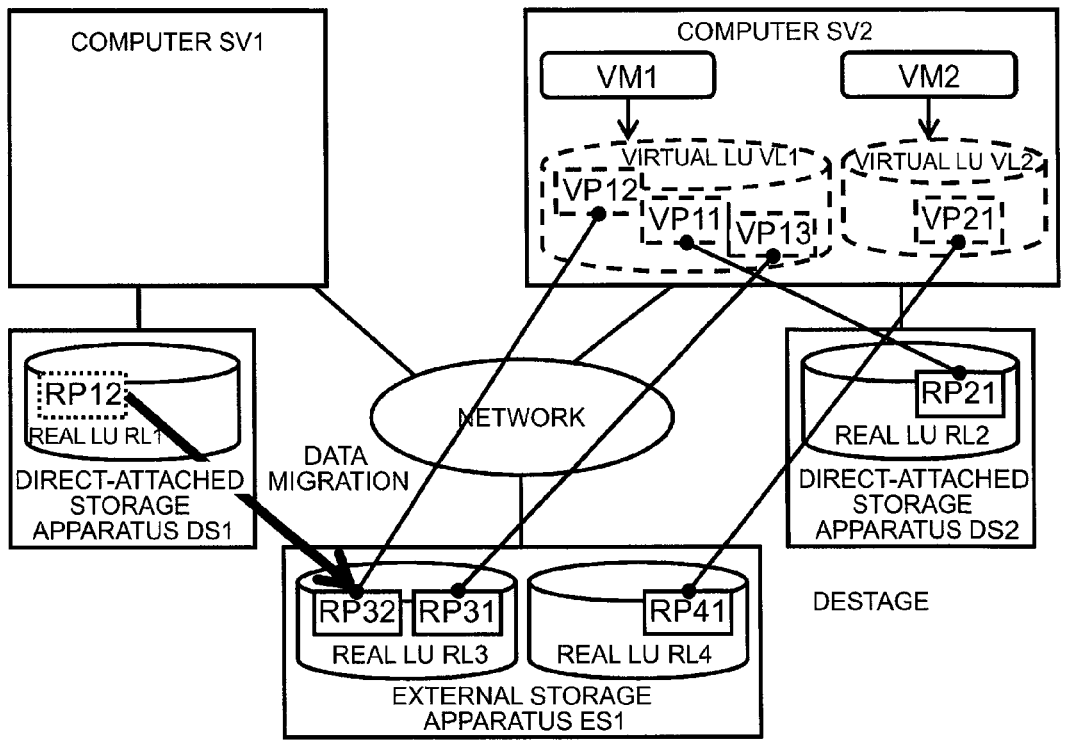
FIG. 6 shows a block diagram of the computer system in the state after destaging in the migration source computer SV1.
FIG. 7A is a VM table for specifying management and control information about VMs.

FIG. 6 shows a block diagram of the computer system in the state after destaging is performed in the migration source computer SV1. The real page RP12 assigned to the virtual page VP12 accessed by the VM1, which has been migrated to the computer SV2, still exists in the computer SV1. It is more preferable that this real page is made free for the virtual pages accessed by the other VMs existing in the computer SV1. Therefore, data in the real page RP12 is destaged to the free real page RP32 in the external storage apparatus ES1. Then, the management terminal 4 reassigns the real page RP32 to the virtual page VP12 and releases the virtual page VP12 from the assignment to the real page RP12.

It should be noted that if the access frequency of all the virtual pages accessed by the operating VM1 is lower than the access frequency of the virtual pages accessed by the VM operating in the migration destination computer, data migration between the direct-attached storage apparatuses and destaging in the migration destination computer are not performed. This is because direct-attached storage apparatuses which are higher-speed storage apparatuses are assigned to the virtual pages of high access frequency. Furthermore, while data migration between direct-attached storage apparatuses is performed after destaging in the migration destination computer, destaging in the migration source computer may be performed before data migration between direct-attached storage apparatuses.

Though the above-mentioned embodiment is based on the assumption that a virtual LU exists for each VM, multiple VMs may share one or multiple virtual LUs. In this case, the CPU 11a and the CPU 11b need to transfer information about which VM uses which area of the virtual LU(s) from the VM control program 37, to the storage control program 38 via a special API. An example of this type of API is vStorage API by VMware. Therefore, as shown in FIG. 36, an entry 424 is added to the virtual LU table 42 and the entry 424 stores information indicating the area range used by the VM, for example, a pair of a starting address and an end address is stored.

Next, the configuration of the above-mentioned management tables will be described with reference to FIGS. 7 to 10. These tables have the array structure and store one or more records. However, the data structure is not limited to the array structure.

FIG. 7A shows an example of the data structure of the VM table 41 (FIG. 2) specifying management and control information about VMs. The VM table 41 has as many records as the number of VMs operating in the computer 1. The records of this table are composed of an entry 411 storing a VM ID, an entry 412 storing a WWN assigned to the VM, and entries 413 and 414 storing the ID of an external storage apparatus accessed by the VM and the LUN of that external storage apparatus, respectively. The WWN assigned to the VM is called a virtual WWN. The VM table 41a is for the VMs in the computer SV1, and the VM table 41b is for the computer SV2. A reference sign with [a] attached at its end to refer to a table hereinafter indicates that the table belongs to the VM migration source computer SV1, and a reference sign with [b] attached at its end to refer to a table indicates that the table belongs to the VM migration destination computer SV2. If the reference sign is not distinguished between a and b, this means that the table belongs to the management terminal or that the table is commonly used for the migration source computer and the migration destination computer.

FIG. 7B shows an example of the data structure of the virtual LU table 42 specifying management and control information about virtual LUs. This table includes as many records as the number of VMs that are set to the computer 1. The records of this table are composed of an entry 421 storing the LUN of a virtual LU accessed by the VM, an entry 422 storing the WWN set to the virtual LU, and an entry 423 storing the virtual capacity of the virtual LU. The virtual LU table 42a and the virtual LU table 42b are virtual LU tables for the computer SV1 and the computer SV2, respectively.

FIG. 7C is an example showing the data structure of the external storage table showing the characteristics of external storage apparatuses 3. This table includes as many records as the number of external storage apparatuses. The records of this table are composed of an entry 431 storing the ID of an external storage apparatus 3 and an entry 432 storing the WWN of the external storage apparatus 3. The computer SV1 and the computer SV2 include the external storage tables 43 of the same content.

FIG. 8A shows an example of the data structure of the mapping table 44 for specifying management and control information for mapping access from the VM to the virtual LU into access to the direct-attached storage apparatus 2 or the external storage apparatus 3. This table includes as many records as the number of virtual pages constituting virtual LUs accessed by the computer 1.

The records of this table are composed of an entry 441 storing the LUN of a virtual LU including a virtual page, an entry 442 storing the ID of the virtual page, an entry 443 storing the frequency of access by the VM to the virtual page, an entry 444 storing the ID of a storage apparatus where the data of the virtual page is really stored, an entry 445 storing the LUN of a real LU where the data is really stored, and an entry 446 storing the ID of a real page where the data is really stored. The mapping table 44a and the mapping table 44b are tables for the computer SV1 and the computer SV2, respectively.

FIG. 8B is an example of the data structure of the direct-attached storage page table 45 for specifying management and control information about direct-attached storage apparatuses. This table includes as many records as the number of real pages constituting the direct-attached storage apparatuses 2. The records of this table are an entry 451 storing the ID of a direct-attached storage apparatus, an entry 452 storing the LUN of a real LU, an entry 453 storing the ID of the real page, and an entry 454 storing the status of the real page. The following types of the real page status are used: NOT ASSIGNED indicating the state of being unassigned; ASSIGNED indicating that the real page is already assigned to the virtual page; and RESERVED indicating that assignment is reserved. The direct-attached storage page tables 45a and 45b are tables for the computer SV1 and the computer SV2, respectively.

FIG. 9 is an example of the data structure of the external storage page table 46 (FIG. 2) for specifying management and control information about real pages in external storage apparatuses. This table includes as many records as the number of real pages constituting real LUs in the external storage apparatus 3 accessed by the computer 1. Each record of the table is composed of an entry 461 storing the ID of an external storage apparatus 3 including a real page corresponding to the record, an entry 462 storing the LUN of a real LU including the real page, an entry 463 storing the ID of the real page, and an entry 464 storing the status of the real page. The following types of the real page status are used: NOT ASSIGNED indicating the state of being unassigned; and ASSIGNED indicating that the real page is already assigned. The external storage page tables 46a and 46b are tables for the computer SV1 and the computer SV2, respectively. The migration destination determination table 47 will be explained later with reference to FIG. 21A.

FIG. 10A is an example of the data structure of the computer table 61 (FIG. 3) of the management terminal 4 for specifying management and control information about computers. This table includes as many records as the number of computers existing in the computer system. Each record of the table is composed of an entry 611 storing the ID of a computer 1, an entry 612 storing the IP address of the computer 1, and an entry 613 storing the WWN of the computer 1.

FIG. 10B is an example of the data structure of the VM table 62 (FIG. 3) of the management terminal 4 for specifying management and control information about VMs. This table includes as many records as the number of VMs existing in the system. Each record of the table is composed of an entry 621 storing the ID of a VM corresponding to the relevant record and an entry 622 storing the ID of the computer 1 where the VM operates.

FIG. 10C is an example of the data structure of the external storage table 63 (FIG. 3) of the management terminal 4 for specifying management and control information about external storage apparatuses. This table includes as many records as the number of external storage apparatuses 3. Each record of the table is composed of an entry 631 storing the ID of an external storage apparatus 3, an entry 632 storing the IP address of the external storage apparatus 3, and an entry 633 storing the WWN of the external storage apparatus 3. The status table 64 will be explained later with reference to FIG. 21B.

Graphical user interfaces (GUIs) which the CPU 11 for the management terminal 4 displays on the output device 17 according to the screen control program 51 will be described with reference to FIG. 11 and FIG. 12. Furthermore, the operation of the processing for initializing the tables stored in the main memories 12a and 12b for the computer 1 and the main memory 12c for the management terminal 4 is described.

FIG. 11A shows an example of a screen 1100 for adding a computer to the computer system. The administrator uses this screen each time he/she connects a new computer 1 to the network 5. This screen is composed of an area 1101 where the ID of the added computer 1 is input, an area 1102 where the IP address of the computer 1 is input, an area 1103 where the WWN for accessing the computer 1 is input, an area 1104 where the ID of a direct-attached storage apparatus 2 directly connected to the computer 1 is input, an area 1105 where the LUN of a real LU created in the direct-attached storage apparatus 2 is input, an area 1106 where the capacity of the real LU is input, a button 1107 for the administrator to add the computer 1, and a button 1108 for the administrator to cancel the addition of the computer 1.

If the administrator clicks the button 1107, the CPU 11c for the management terminal 4 adds a new record to the computer table 61 (FIG. 10A) according to the screen control program 51, using the data input to the area 1101, the area 1102, and the area 1103.

Furthermore, the CPU 11c for the management terminal 4 sends an LU creation request to the computer 1 having the ID, which is input to the area 1101, to create an LU in the direct-attached storage apparatus according to the computer communication program 53. The IP address of the transmission destination of this request is the IP address input to the area 1102. This request includes the data input to the area 1104, the area 1105, and the area 1106. It should be noted that if the direct-attached storage apparatus is connected to the management network, this creation request may be transmitted directly to the direct-attached storage apparatus.

If the computer 1 receives this request, the CPU 11 for the computer 1 fetches the data included in this request according to the management terminal communication program 35. Next, the CPU 11 for the computer 1 creates a real LU having the LUN, which is input to the area 1105, and the capacity, which is input to the area 1106, in the direct-attached storage apparatus 2 having the ID, which is input to the area 1104, according to the internal I/O control program 33.

Next, the CPU 11 for the computer 1 adds one or more records to the direct-attached storage page table 45 (FIG. 8B) according to the internal I/O control program 33. The number of records is the number obtained by dividing the data input to the area 1106, that is, the capacity of the created real LU in the direct-attached storage apparatus 2 by the page size. The entry 451 of each record stores the data input to the area 1104, that is, the ID of the direct-attached storage apparatus 2; the entry 452 stores the data input to the area 1105, that is, the LUN of the created real LU; the entry 453 stores the ID of the page corresponding to the record; and the entry 454 stores a value indicating the state of being unassigned, for example, NOT ASSIGNED. The page IDs are automatically numbered. Then, the CPU 11 for the computer 1 transmits a response indicating that the LU was created in the direct-attached storage apparatus, to the management terminal 4 according to the management terminal communication program 35. If the management terminal 4 receives this response, the CPU 11 for the management terminal 4 erases the screen 1100 according to the screen control program 51.

FIG. 11B shows an example of an external storage addition screen 1110. This screen includes an area 1111 where the ID of the added external storage apparatus 3 is input, an area 1112 where the IP address of the external storage apparatus 3 is input, an area 1113 where the WWN for accessing the external storage apparatus 3 is input, a button 1114 for the administrator to add the external storage apparatus 3, and a button 1115 for the administrator to cancel the addition of the external storage apparatus 3.

If the administrator clicks the button 1114, the CPU 11c for the management terminal 4 adds a new record to the external storage table 63 (FIG. 10C) according to the screen control program 51, using the data input to the area 1111, the area 1112, and the area 1113.

Furthermore, the CPU 11c for the management terminal 4 transmits an external storage apparatus addition request to all the computers 1 registered to the computer table 61 (FIG. 10A) according to the computer communication program 53. This request includes the data input to the area 1111 and the area 1113.

If the computer 1 receives this request, the CPU 11 for the computer 1 fetches the data included in this request according to the management terminal communication program 35. Next, the CPU 11 for the computer 1 adds one record to the external storage table 43 (FIG. 7C) according to the external I/O control program 34. The entry 431 of the added record stores the data input to the area 1111, that is, the ID of the external storage apparatus 3 and the entry 432 stores the data input to the area 1113, that is, the WWN of the external storage apparatus 3. Then, the CPU 11 for the computer 1 transmits an external storage apparatus addition response to the management terminal 4 according to the management terminal communication program 35. If the management terminal 4 receives external storage addition responses from all the computers 1, the CPU 11c for the management terminal 4 erases the screen 1110 according to the screen control program 51.

FIG. 12 shows an example of a setting screen 1200 of the management terminal 4 for adding a VM to the computer. The screen includes an area 1201 for selecting a computer 1 to add a VM, an area 1202 for inputting the ID of the VM, an area 1203 for inputting a virtual WWN used by the VM, an area 1204 for inputting the LUN of the virtual LU accessed by the VM, an area 1205 for inputting the virtual capacity of the virtual LU, an area 1206 for selecting the ID of the external storage apparatus 3 accessed by the VM, an area 1207 for inputting the LUN of a real LU in the external storage apparatus 3 accessed by the VM, an area 1208 for inputting the capacity of the real LU, a button 1209 for the administrator to add the VM, and a button 1210 for the administrator to cancel the addition of the VM.

If the administrator clicks the button 1209, the CPU 11*c* for the management terminal 4 adds a new record to the VM table 62 (FIG. 10B) according to the screen control program 51, using the data input to the area 1201 and the area 1202.

Furthermore, the CPU 11*c* for the management terminal 4 transmits a request to the external storage apparatus 3 having the ID selected in the area 1206 to create a real LU having the LUN input to the area 1207 and the capacity input to the area 1208, according to the external storage communication program 54. If the management terminal 4 receives a response to this request from the external storage apparatus 3, the CPU 11 for the management terminal 4 transmits a VM addition preparation request to the computer 1 having the ID selected in the area 1201 according to the computer communication program 53. This request includes the data input to or selected in the area 1202, the area 1203, the area 1204, the area 1205, the area 1206, the area 1207, and the area 1208.

If the computer 1 receives this request, the CPU 11 for the computer 1 fetches the data included in this request according to the management terminal communication program 35. Next, the CPU 11 for the computer 1 adds one or more records to the external storage page table 46 (FIG. 9) according to the external I/O control program 34.

The number of records to be added is the number obtained by dividing the data input to the area 1208, that is, the capacity of the created real LU in the external storage apparatus 3 by the size of a real page. The entry 461 of each added record stores the data selected in the area 1206, that is, the ID of the external storage apparatus 3; the entry 462 stores the data input to the area 1207, that is, the LUN of the created real LU; the entry 463 stores the ID of the page corresponding to the LUN of the real LU; and the entry 464 stores a value indicating the state of being unassigned, for example, NOT ASSIGNED. The page IDs are automatically numbered.

Next, the CPU 11 for the computer 1 adds one record to the VM table 41 (FIG. 7A) according to the external I/O control program 34. The entry 411 of the added record stores the data input to the 1202, that is, the ID of the added VM; the entry 412 stores the data input to the area 1203, that is, the virtual WWN used by the added VM; the entry 413 stores the data selected in the area 1206, that is, the ID of the external storage apparatus 3 accessed by the VM to be added; and the entry 414 stores the data input to the area 1207, that is, the LUN of the real LU in the external storage apparatus 3 accessed by the added VM.

Next, the CPU 11 for the computer 1 adds one record to the virtual LU table 42 (FIG. 7B) according to the internal I/O control program 33. The entry 421 of the added record stores the data input to the area 1204, that is, the LUN of a virtual LU provided to the VM to be added; the entry 422 stores the data input to the area 1203, that is, the virtual WWN used by the added VM; and the entry 423 stores the data input to the area 1205, that is, the virtual capacity of the virtual LU.

Next, the CPU 11 for the computer 1 adds one or more records to the mapping table 44 (FIG. 8A) according to the internal I/O control program 33. The number of records to be added is the number obtained by dividing the data input to the area 1205, that is, the virtual capacity of the virtual LU by the page size. The entry 441 of each added record stores the data input to the area 1204, that is, the LUN of a virtual LU; the entry 442 stores the ID of a page corresponding to the record; the entry 443 stores data indicating the state of not being accessed yet, that is, 0; and the entry 444, the entry 445, and the entry 446 stores data indicating that no real page is assigned to the virtual page, for example, N/A. The page IDs are automatically numbered. Then, the CPU 11 for the computer 1 transmits a response indicating that the preparation for adding a VM is completed, to the management terminal 4 according to the management terminal communication program 35.

If the management terminal 4 receives this response, the CPU 11 for the management terminal 4 transmits a request to the computer 1 having the ID selected in the area 1201 to add a VM according to the computer communication program 53. This request includes the data input to the area 1202, the area 1203, and the area 1204. If the computer 1 receives this request, the CPU 11 for the computer 1 executes the management terminal communication program 35, and fetches the data included in this request. Next, the CPU 11 for the computer 1 creates a VM having the ID input to the area 1202 according to the VM control program 37. This VM accesses the virtual LU having the LUN input to the area 1204, using the virtual WWN input to the area 1203. Then, the CPU 11 for the computer 1 transmits, according to the management terminal communication program 35, a response indicating that the VM is added to the management terminal 4.

If the management terminal 4 receives the VM addition response from the computer 1, the CPU 11*c* for the management terminal 4 erases the screen 1200 according to the screen control program 51.

Figure 13:
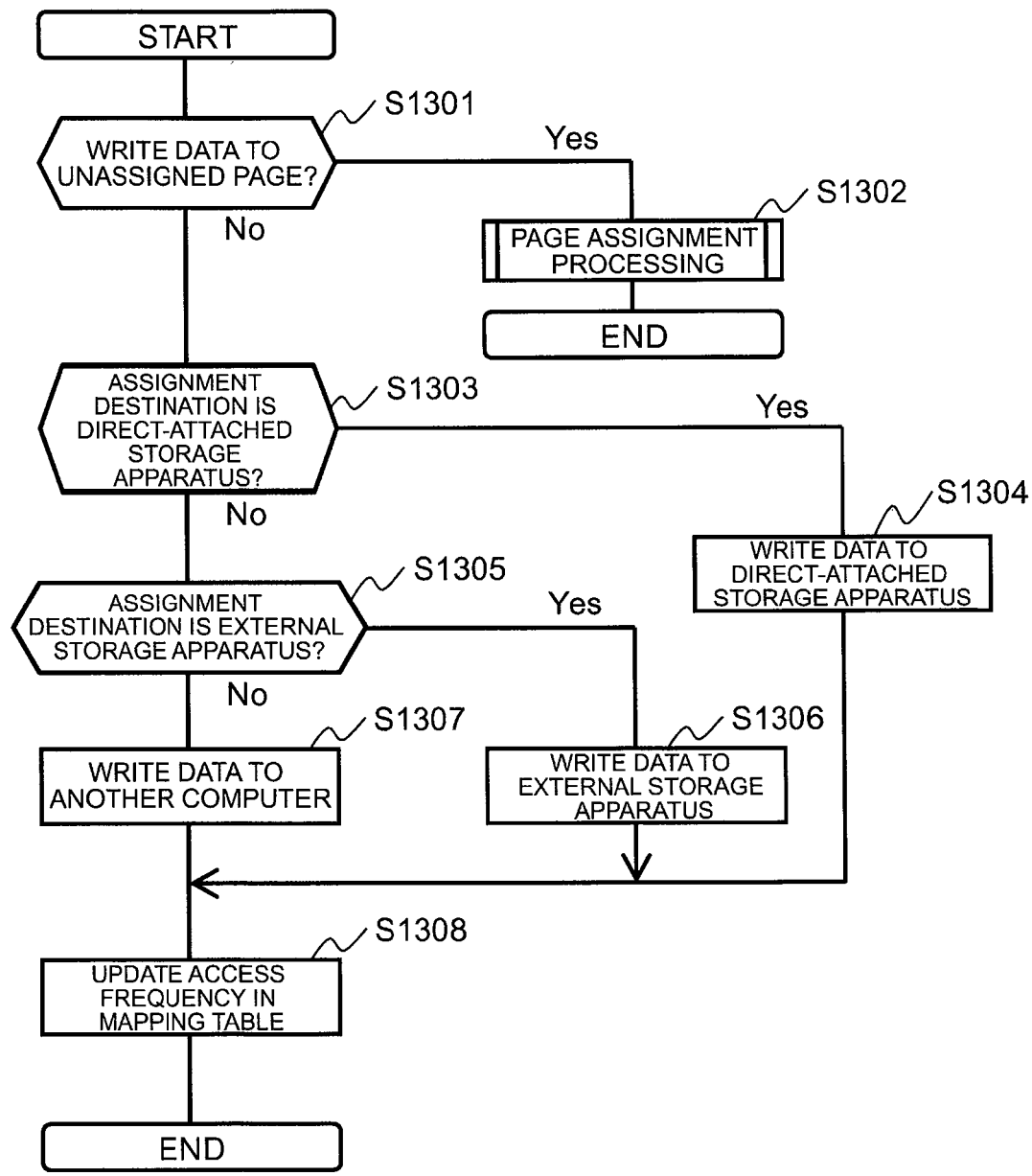
FIG. 13 is a flowchart illustrating internal write processing executed by the computer.

The operations of the computer 1 will be described with reference to FIGS. 13 to 19. FIG. 13 shows an example of a flowchart illustrating internal write processing executed by the CPU 11 for the computer 1 according to the internal I/O control program 33. This processing is started if a VM in the computer 1 executes the application program 36 and writes data to a virtual LU.

Firstly, the CPU 11 for the computer 1 identifies a virtual page corresponding to the data according to the address of the data to be written. Then, the CPU 11 refers to the mapping table 44 (FIG. 8A) and checks whether a real page is already assigned to the virtual page or not (S1301). If no real page is assigned, the CPU 11 executes page assignment processing described later with reference to FIG. 14 (S1302). If a real page is already assigned, the CPU 11 refers to the mapping table 44 and checks whether the assigned real page is a real page in a direct-attached storage apparatus 2 or not (S1303).

If it is found as the result of the above judgment that the assigned real page is a real page in a direct-attached storage apparatus 2, the CPU 11 writes data to the real page in the direct-attached storage apparatus 2 (S1304). If the page is not a real page in the direct-attached storage apparatus 2, the CPU 11 refers to the mapping table 44 and checks whether the assigned real page is a real page in an external storage apparatus 3 or not (S1305). If the page is a real page in an external storage apparatus 3, the CPU 11 writes data to the external storage apparatus 3 (S1306).

If the page is not a real page in an external storage apparatus 3, the CPU 11 writes data to another computer 1 (S1307). After S1304, S1306, or S1307 is completed, the CPU 11 updates the access frequency (443) of the record corresponding to the virtual page in the mapping table 44 identified in S1301 (S1308) and completes this processing.

It should be noted that the CPU judges whether to assign a virtual page to a direct-attached storage apparatus or an external storage apparatus, by referring to the storage ID 444 of the record corresponding to the real page in the mapping table 44 and determining whether the relevant real page is a real page in a direct-attached storage apparatus or a real page in an external storage apparatus.

Figure 14:
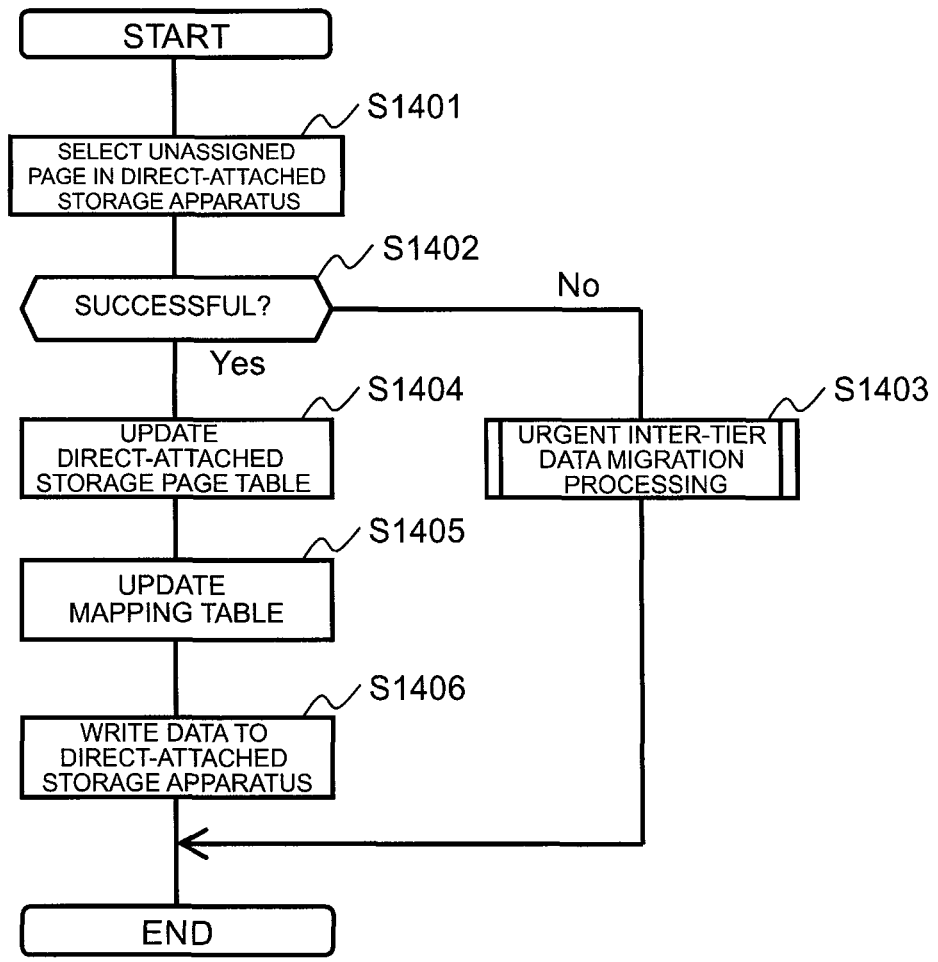
FIG. 14 is a flowchart illustrating page assignment processing executed by the computer.

FIG. 14 shows an example of the flowchart illustrating the page assignment processing executed by the CPU 11 for the computer 1 according to the internal I/O control program 33. Firstly, the CPU 11 refers to the direct-attached storage page table 45 and selects a real page which is not assigned yet (S1401).

The CPU 11 makes the processing branch based on whether this selection is done successfully or not (S1402). If the selection fails, the CPU 11 executes urgent inter-tier data migration processing which will be explained later in detail with reference to FIG. 15 (S1403), and terminates this processing. If the selection is done successfully, the CPU 11 updates the record corresponding to the selected real page in the direct-attached storage page table 45 (FIG. 8B) (S1404). Specifically speaking, the CPU 11 changes the entry 454 of the record to the data indicating that assignment is completed, for example, ASSIGNED.

Next, the CPU 11 updates the record corresponding to the virtual page in the mapping table 44 identified in S1301 (S1405). Specifically speaking, the entry 443 of the record is changed to the value of the latest access frequency, the entry 444 is changed to the ID of the direct-attached storage apparatus 2, the entry 445 is changed to the LUN of a real LU created in the direct-attached storage apparatus 2, and the entry 446 is changed to the ID of a real page selected in S1401. Finally, the CPU 11 writes data to the real page selected in S1401 (S1406).

Figure 15:
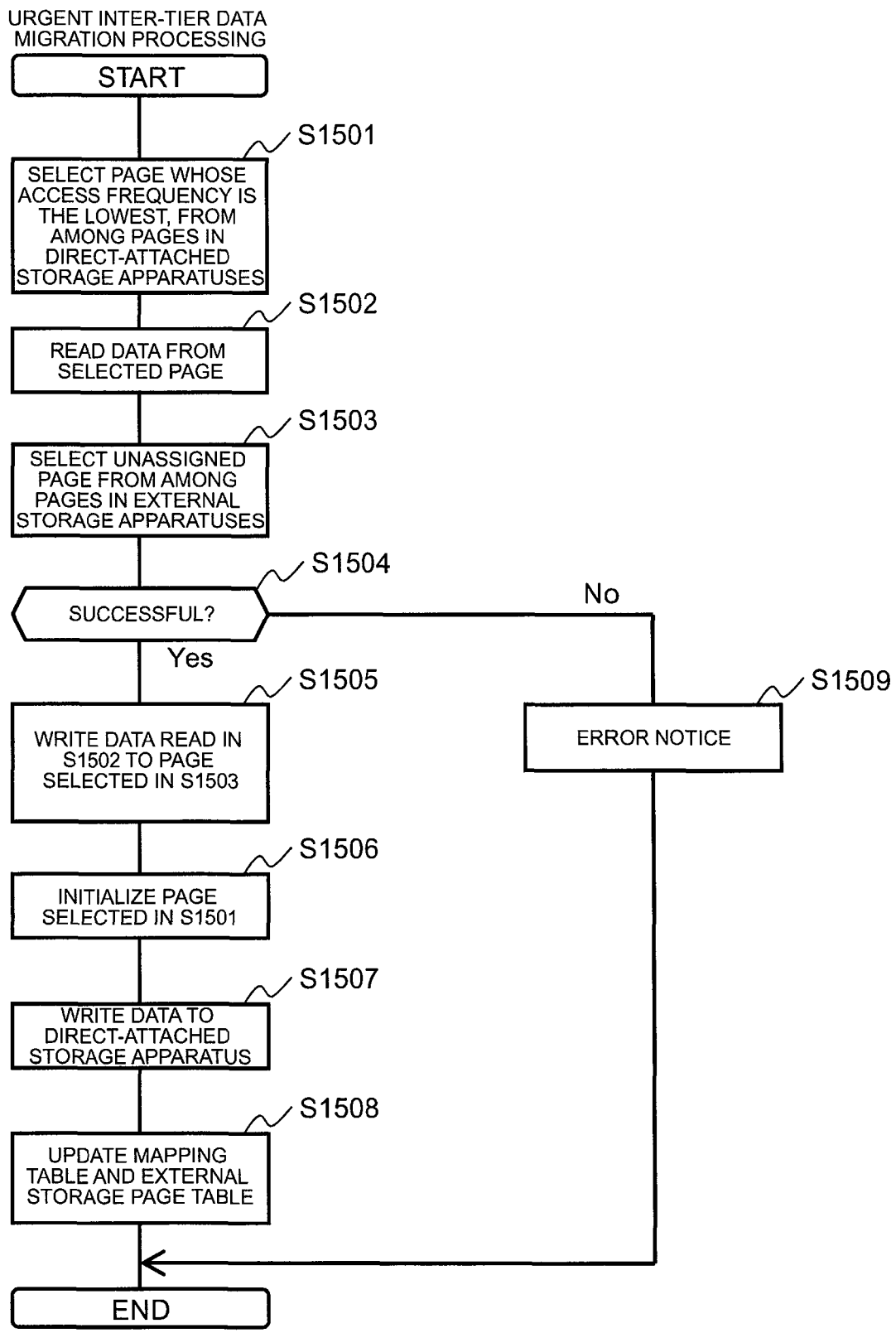
FIG. 15 is a flowchart illustrating processing executed by the computer for urgently migrating data between storage tiers.

FIG. 15 is an example of a flowchart illustrating processing executed by the CPU 11 for the computer 1 for urgently migrating data between tiers in a storage apparatus according to the hierarchical control program 31. Firstly, the CPU 11 refers to the mapping table 44, selects a real page whose access frequency is the lowest from among the assigned real pages in the direct-attached storage apparatus 2 (S1501), and reads data from the real page (S1502).

Next, the CPU 11 refers to the external storage page table 46 (FIG. 9) and selects a real page which is not assigned yet (S1503). The CPU 11 makes the processing branch based on whether this selection is done successfully or not (S1504). If the selection fails, this means that there is no free capacity in the direct-attached storage apparatus 2 or in the external storage apparatus 3, so that the CPU 11 notifies the administrator of the occurrence of an error (S1509). This notice is sent, for example, by email or an event log.

If the selection is done successfully, the CPU 11 writes the data read in S1502 to the real page selected in S1503 (S1505) and initializes the data of the real page selected in S1501 (S1506). This initialization is performed, for example, by the CPU 11 writing 0 to all the storage areas in the real page.

The CPU 11 updates the mapping table 44 (FIG. 8A) and the external storage page table 46 (FIG. 9) (S1508). Specifically speaking, from among the records in the mapping table 44, the CPU 11 changes the entry 444 of the record corresponding to the virtual page, to which the real page selected in S1501 is assigned, to the ID of the external storage apparatus 3, the entry 445 to the LUN of the real LU in the external storage apparatus 3, and the entry 446 to the ID of the real page selected in S1503, respectively.

Furthermore, from among the records in the mapping table 44, the CPU 11 changes the entry 443 of the record corresponding to the virtual page identified in S1301 to a value of the latest access frequency, the entry 444 to the ID of the direct-attached storage apparatus 2, the entry 445 to the LUN of the real LU created in the direct-attached storage apparatus 2, the entry 446 to the ID of the real page in the direct-attached storage apparatus 2 assigned to the virtual page selected in S1501, respectively.

The CPU for the computer 1 changes the entry 464 of the record corresponding to the real page selected in S1503 in the external storage page table 46 (FIG. 9) to data indicating the state of being already assigned. Finally, the CPU 11 writes the data to the real page selected in S1501 (S1507) and completes this processing.

Figure 16:
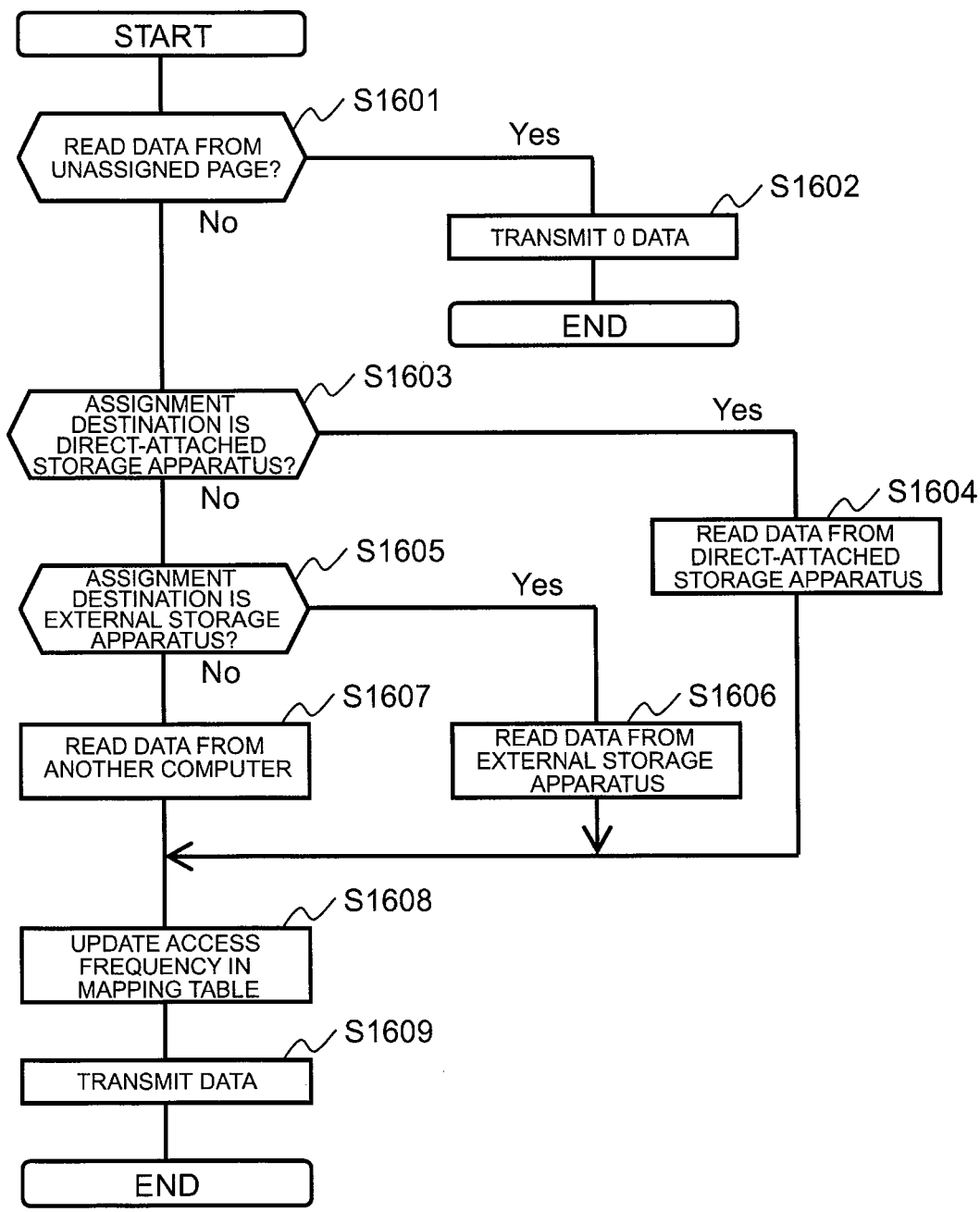
FIG. 16 is a flowchart illustrating internal read processing executed by the computer.

FIG. 16 is an example of a flowchart illustrating internal read processing executed by the CPU 11 for the computer 1 according to the internal I/O control program 33. This processing is executed when a VM in the computer 1 reads data from a virtual LU according to the application program 36.

Firstly, the CPU 11 identifies a virtual page corresponding to the data according to the address of data to be read. Then, the CPU 11 refers to the mapping table 44 (FIG. 8A) and checks whether a real page is already assigned to the virtual page or not (S1601). If no page is assigned, the CPU 11 transmits 0 data to the main memory 12 (S1062) and completes the processing.

If a real page is already assigned, the CPU 11 refers to the mapping table 44 and checks whether the assigned real page is a real page in a direct-attached storage apparatus 2 or not (S1603). If the page is a real page in a direct-attached storage apparatus 2, the CPU 11 reads data from the real page in the direct-attached storage apparatus 2 (S1604).

If the page is not a real page in a direct storage 2, the CPU 11 refers to the mapping table 44 and checks whether the assigned real page is a real page in an external storage apparatus 3 or not (S1605). If the page is a real page of an external storage apparatus 3, the CPU 11 reads data from the external storage apparatus 3 (S1606).

If the page is not a real page in an external storage apparatus 3, the CPU 11 reads data from another computer 1 (S1607). After S1604, S1606, or S1607 is completed, the CPU 11 updates the entry 443 (access frequency) of the record corresponding to the virtual page in the mapping table 44 identified in S1601 (S1608).

Finally, the CPU 11 transmits the read data to the main memory 12 (S1609) and completes the processing. Then, the CPU 11 reads the data transferred to the main memory 12 and executes various types of processing of the application program according to the application program 36. It should be noted that possible characteristics to be used instead of the access frequency include the importance of data and the data creation date.

Figure 17A:
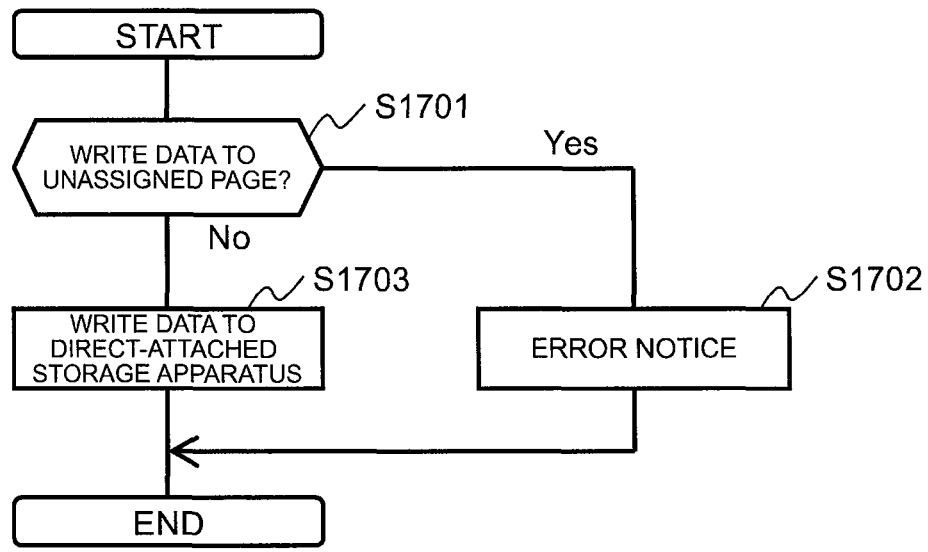
FIG. 17A is a flowchart illustrating external write processing executed by a computer 1.

FIG. 17A is an example of a flowchart illustrating external write processing executed by the CPU 11 for the computer 1 according to the external I/O control program 34. This processing is executed when a VM of another computer 1 receives a write request from a VM of another computer 1.

Firstly, the CPU 11 identifies a virtual page corresponding to the data according to the address of data to be written. Then, the CPU 11 refers to the mapping table 44 and checks whether a real page in a direct-attached storage apparatus 2 is already assigned to the virtual page or not (S1701). If no real page in a direct-attached storage apparatus 2 is assigned to the virtual page, the CPU 11 cannot write the data received from the other computer to the direct-attached storage apparatus, so that it notifies the administrator of an error (S1702) and completes this processing. On the other hand, if a real page is already assigned, the CPU 11 writes the data to the real page identified in S1701 (S1703) and completes this processing.

Figure 17B:
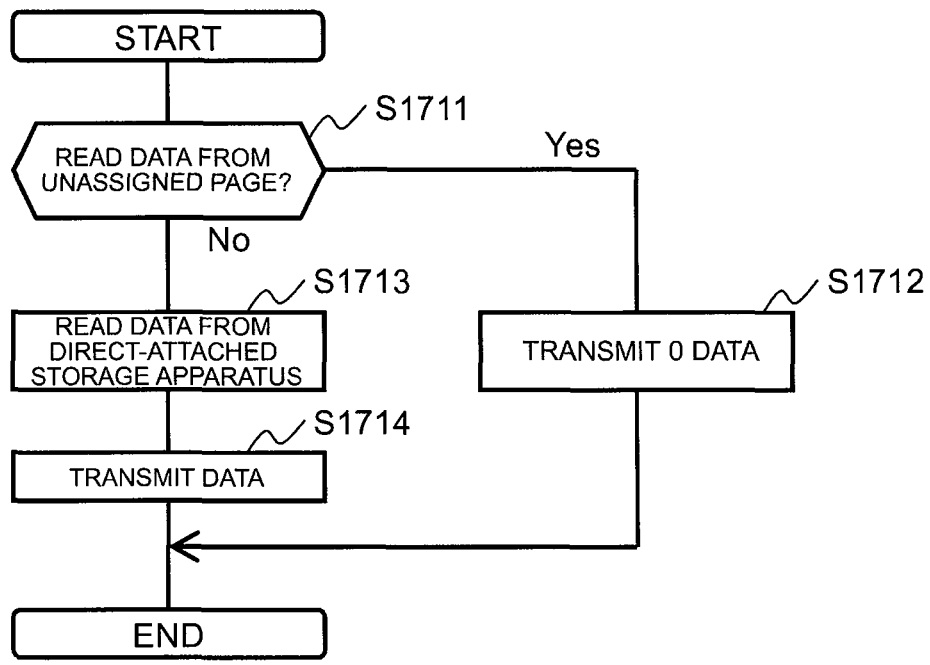
FIG. 17B is a flowchart illustrating an external read processing executed by the computer 1.

FIG. 17B shows an example of a flowchart illustrating external read processing executed by the CPU 11 for the computer 1 according to the external I/O control program 34. This processing is executed when the computer 1 receives a read request from a VM of another computer 1. Firstly, the CPU 11 identifies a virtual page corresponding to the data according to the address of data to be read.

Then, the CPU 11 refers to the mapping table 44 (FIG. 8A) and checks whether a real page in a direct-attached storage apparatus 2 is already assigned to the virtual page or not (S1711). If no page is assigned yet, the CPU 11 transmits 0 data to the other computer 1 (S1712) and completes this processing. If a page is already assigned, the CPU 11 reads the data from the real page identified in S1711 (S1713), transmits the data to the other computer 1 (S1714), and completes this processing.

FIG. 18 is a flowchart illustrating a first form of processing executed by the CPU 11 for the computer 1 for migrating data between storage tiers according to the hierarchical control program 31. This processing is executed by the CPU 11 for migrating data, which is stored in the direct-attached storage apparatus 2 and whose access frequency is relatively low, to an external storage apparatus 3 in order to increase the free capacity or free real pages in a direct-attached storage apparatus 2. This processing is executed at a time interval that is specified in advance or input by the administrator. Alternatively, this processing may be executed when the number of free pages in the direct-attached storage apparatus 2 reduces to less than a threshold that is specified in advance or input by the administrator.

Firstly, the CPU 11 for the computer 1 refers to the direct-attached storage page table 45 (FIG. 8B) and selects a real page in the direct-attached storage apparatus 2 (S1801).

Next, the CPU 11 refers to the mapping table 44 (FIG. 8A) and checks whether the access frequency of a virtual page to which the real page selected in S1801 is assigned is lower than the threshold specified in advance or input by the administrator or not (S1802). If the access frequency is higher than the specified threshold, the CPU 11 proceeds to S1808. On the other hand, if the access frequency is lower than the threshold, the CPU 11 refers to the external storage page table 46 and selects an unassigned real page (S1803).

The CPU 11 makes the processing branch based on whether this selection is done successfully or not (S1804). If the selection fails, there is no free capacity in the external storage apparatus 3, so that the CPU 11 terminates this processing. If the selection is done successfully, the CPU 11 reads data from the real page in the direct-attached storage apparatus selected in S1801 and writes the data to the real page in the external storage apparatus selected in S1803 (S1805). Furthermore, the CPU 11 initializes the data of the real page in the direct-attached storage apparatus selected in S1801 (S1806).

Next, the CPU 11 updates the mapping table 44 (FIG. 8A), the direct-attached storage page table 45 (FIG. 8B), and the external storage page table 46 (FIG. 9) (S1807). Specifically speaking, from among the records in the mapping table 44, the CPU 11 changes the entry 444 of the record corresponding to the virtual page, to which the real page selected in S1801 is assigned, to the ID of the external storage apparatus 3, the entry 445 to the LUN of the real LU in the external storage apparatus 3, and the entry 446 to the ID of the real page selected in S1803, respectively. Furthermore, the CPU 11 changes the entry 454 of the record corresponding to the real page selected in S1801 in the direct-attached storage page table 45 to the data indicating the state of not being assigned. Furthermore, the CPU 11 changes the entry 464 of the record corresponding to the real page selected in S1803 in the external storage page table 46 to the data indicating the state of being already assigned. The CPU 11 repeats the processing from S1801 to S1807 with respect to all the real pages in the direct-attached storage apparatus 2 (S1808).

Figure 19:
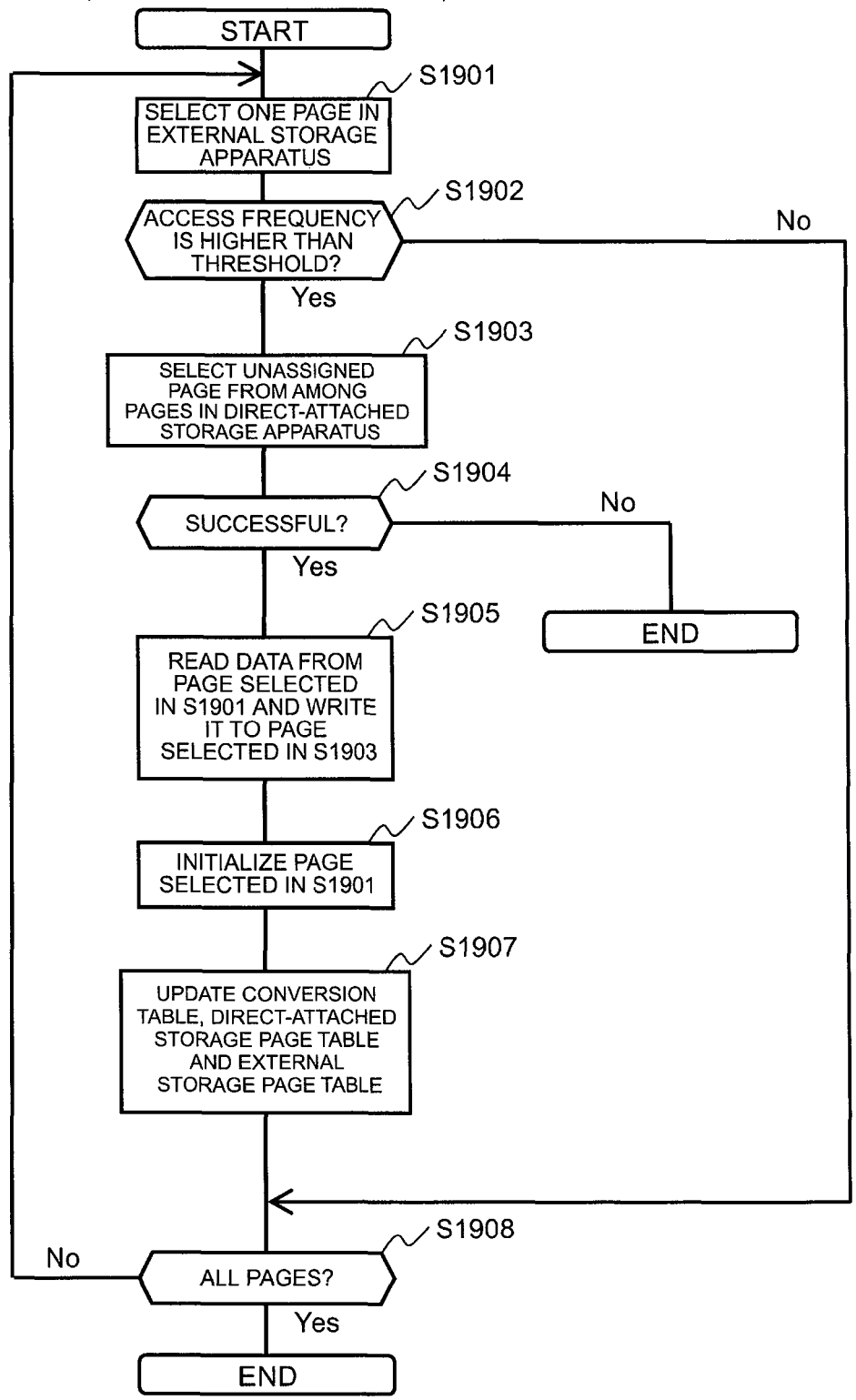
FIG. 19 is a flowchart illustrating a second form of processing executed by the computer for migrating data between storage tiers.

FIG. 19 is a flowchart related to a second form of processing executed by the CPU 11 for the computer 1 for migrating data between storage tiers according to the hierarchical control program 31. This processing is executed by the CPU 11 for migrating data, which is stored in the external storage apparatus 3 and whose access frequency is relatively high, to a direct-attached storage apparatus 2 in order to improve the access performance from VMs with respect to the data which is stored in the external storage apparatus 3 and whose access frequency is relatively high.

This processing is executed immediately after the inter-tier data migration processing in FIG. 18. Alternatively, this processing may be executed at a time interval that is specified in advance or input by the administrator. Furthermore, this processing may also be executed when the number of free pages in the external storage apparatus 3 reduces to less than a threshold that is specified in advance or input by the administrator.

Firstly, the CPU 11 refers to the external storage page table 46 (FIG. 9) and selects a real page in the external storage apparatus 3 (S1901). Next, the CPU 11 refers to the mapping table 44 (FIG. 8A) and checks whether the access frequency of a virtual page to which the real page selected in S1901 is assigned is higher than the threshold specified in advance or input by the administrator or not (S1902).

If the access frequency is lower than the threshold, the CPU 11 proceeds to the processing in S1908. If the access frequency is higher than the threshold, the CPU 11 refers to the direct-attached storage page table 45 and selects an unassigned real page (S1903). The CPU 11 makes the processing branch based on whether this selection is done successfully or not (S1904).

If this selection fails, there is no free capacity in the direct-attached storage apparatus 2, so that the CPU 11 completes this processing. If the selection is done successfully, the CPU 11 reads data from the real page in the external storage apparatus selected in S1901 and writes the data to the real page in the direct-attached storage apparatus selected in S1903 (S1905).

Next, the CPU 11 initializes the data of the real page selected in S1901 (S1906). Furthermore, the CPU 11 updates the mapping table 44, the direct-attached storage page table 45, and the external storage page table 46 (S1907). Specifically speaking, from among the records in the mapping table 44, the CPU 11 changes the entry 444 of the record corresponding to the virtual page, to which the real page selected in S1901 is assigned, to the ID of the direct-attached storage apparatus 2, the entry 445 to the LUN of the real LU in the direct-attached storage apparatus 2, and the entry 446 to the ID of the real page selected in S1903, respectively.

Furthermore, the CPU 11 changes the entry 454 of the record corresponding to the real page selected in S1903 in the direct-attached storage page table 45 to the data indicating the state of being already assigned. Furthermore, the CPU 11 changes the entry 464 of the record corresponding to the real page selected in S1901 in the external storage page table 46 to the data indicating the state of being not assigned. The CPU 11 repeats the processing from S1901 to S1907 with respect to all the real pages in all the real LUs in the external storage apparatus 3 (S1908).

Next, the operation of the computer system when migrating VMs will be described. FIG. 21B is an example of the data structure of the table 64 relating to the VM status. This table includes as many records as the number of VMs which are being migrated. Each record of this table is composed of an entry 641 storing the ID of a VM which is being migrated and an entry 642 storing the status of data related to the VM.

FIG. 22A is an example of a VM migration screen 2200 which the CPU 11c for the management terminal 4 displays on the output device 17 according to the screen control program 51. The administrator uses this GUI when migrating VMs between computers. This screen is composed of an area 2201 for selecting the ID of a computer 1 as the migration source of a VM, an area 2202 for selecting the ID of the VM to be migrated, an area 2203 for selecting the ID of a computer 1 as the migration destination of the VM, a button 2204 for the administrator to migrate the VM, and a button 2205 for the administrator to cancel the VM migration.

If the administrator clicks the button 2204, the CPU 11c for the management terminal 4 updates, according to the VM migration program 52, the entry 642 in the status table 64 corresponding to the VM selected in the area 2202 to the status indicating that the VM is being migrated, for example, VM Is Being Migrated. FIG. 22A shows the status of the computer system before the administrator clicks the button 2204 (before the VM is migrated).

FIG. 22B shows an example screen of a status display screen 2210 of the management terminal 4. This screen is composed of an area 2211 where the ID of a VM to be migrated is displayed, an area 2212 where the status of the data accessed by the VM is displayed, and a button 2213 for cancelling the VM migration during the migration process. After updating the status table 64, the CPU 11c for the management terminal 4 displays this screen on the output device 17 according to the screen control program 51. A message indicating that a VM is being migrated, for example, VM Is Being Migrated is displayed in the area 2212.

Figure 20:
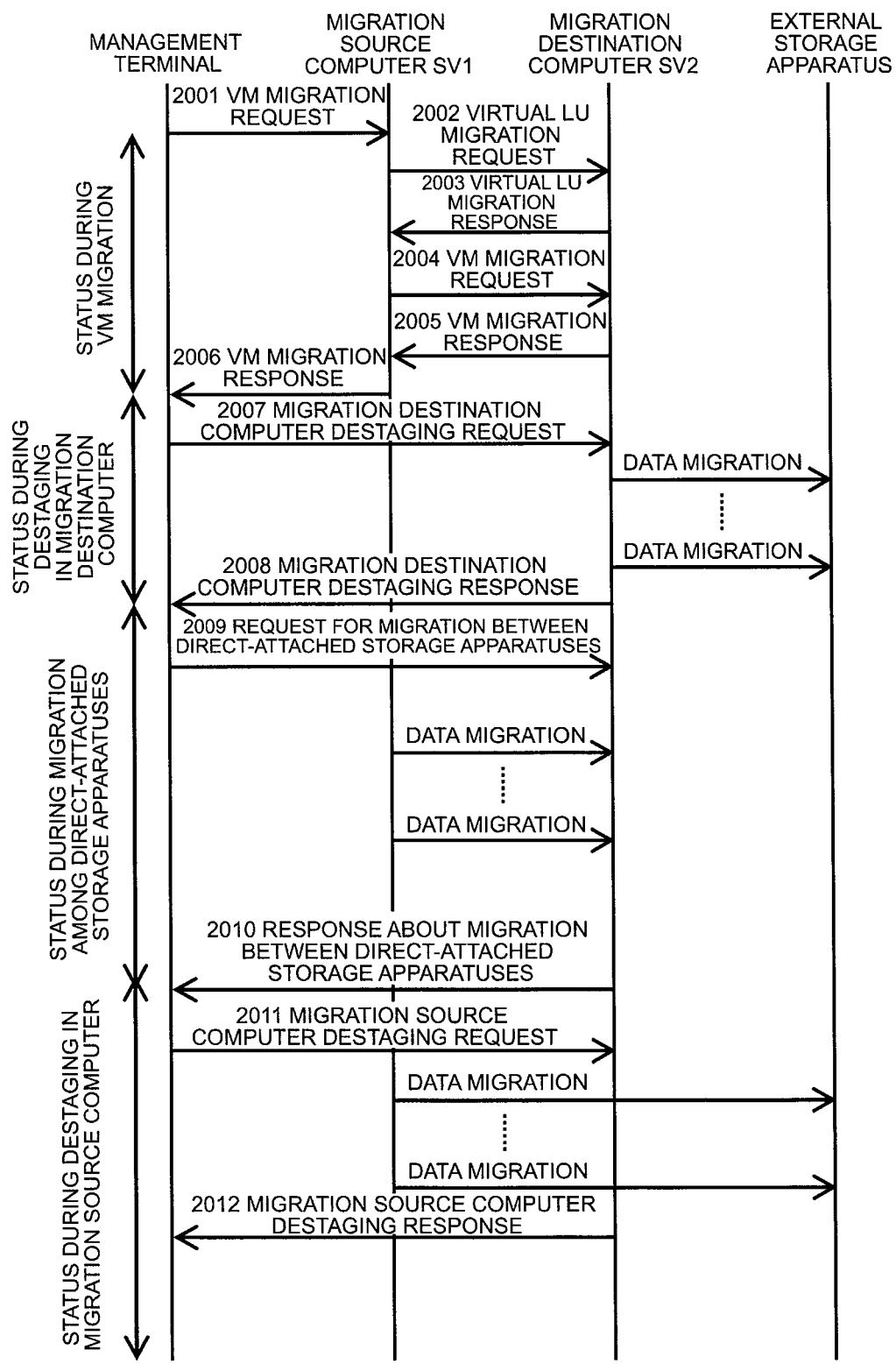
FIG. 20 is a time chart illustrating a communication sequence in the computer system in the process of VM migration between multiple computers.

FIG. 20 is an example of a time chart illustrating a communication sequence in the computer system in the process of migration of a VM between multiple computers. FIG. 20 corresponds to FIGS. 4A to 6. Specifically speaking, a VM1 is migrated from the computer SV1 to the computer SV2, which causes the processing for migrating data between the storage apparatuses to be executed. The computer 1 serving as the migration source of the VM is called a migration source computer, while the computer 1 serving as the migration destination of the VM is called a migration destination computer. The migration source computer is the SV1 and the migration destination computer is the SV2.

After displaying the status display screen 2210 (FIG. 22B), the CPU 11c for the management terminal 4 transmits a VM migration request 2001 to the migration source computer (SV1) selected in the area 2201 according to the computer communication program 53. This request includes the data selected in the area 2202, that is, the ID of the VM to be migrated and the data selected in the area 2203, that is, the ID of the migration destination computer. Furthermore, this request also includes the IP address of the migration destination computer SV2 (FIG. 10A).

If the migration source computer SV1 receives the VM migration request 2001, the CPU 11a for the migration source computer SV1 fetches the data from this request according to the management terminal communication program 35. Next, the CPU 11a transmits a request 2002 to the migration destination computer SV2 to migrate a virtual LU from the computer SV1 to the computer SV2 according to the distribution control program 32.

This request includes, from among the records in the VM table 41a (FIG. 7A), data of the record corresponding to the VM to be migrated (VM1) (the virtual WWN is [00000001], the external storage apparatus ID is [ES1], and its LUN is [RL3]). Furthermore, this request includes data of the record corresponding to the virtual LU provided to the VM from among the records in the virtual LU table 42a (FIG. 7B). Furthermore, this request includes data of the record corresponding to the virtual LU from among the records in the mapping table 44a (FIG. 8A). Furthermore, this request includes data of the record corresponding to the real LU used by the VM from among the records in the external storage page table 46a (FIG. 9).

If the migration destination computer (SV2) receives the virtual LU migration request 2002, the CPU 11b for the migration destination computer (SV2), fetches the data from this request according to the distribution control program 32 and updates the VM table 41b (FIG. 7A), the virtual LU table 42b (FIG. 7b), the mapping table 44b (FIG. 8A), and the external storage page table 46b (FIG. 9) based on the fetched data.

Next, an example of the data structure of the tables in the computer SV2 after this update will be described. A record 4101 is added to the VM table 41b (FIG. 23A), a record 4201 is added to the virtual LU table 42b (FIG. 23B), three records 4401 are added to the mapping table 44b (FIG. 23C), and two records 4601 are added to the external storage page table 46b (FIG. 23D), respectively.

Subsequently, the CPU 11b for the VM migration destination computer (SV2) creates a migration destination determination table 47 according to the distribution control program 32. The migration destination determination table is a table used upon the VM migration by the computer, whose VM has been migrated, to determine the destination to which data should be migrated between the storage apparatuses. FIG. 21A shows an example of the data structure of the migration destination determination table 47. This table is composed of an entry 471 storing the LUN of a virtual LU provided to the VM operating in the computer 1, an entry 472 storing the ID of a virtual page corresponding to the virtual LU, an entry 473 storing the access frequency of the virtual page, an entry 474 storing the ID of the migration source storage apparatus, and an entry 475 storing the ID of the migration destination storage apparatus. Processing for creating this migration destination determination table 47 will be explained below with reference to FIG. 27.

Figure 27:
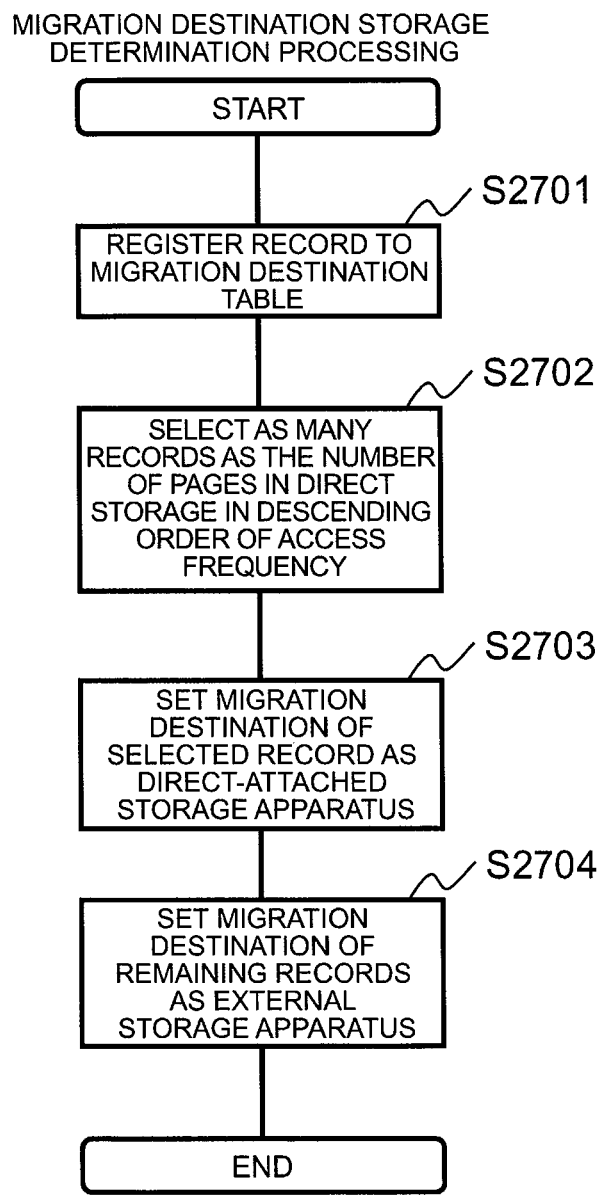
FIG. 27 is a flowchart illustrating processing for creating the migration destination determination table.

FIG. 27 is an example of a flowchart illustrating the processing executed by the CPU 11b for the migration destination computer according to the distribution control program 32. Firstly, the CPU 11b fetches, from the mapping table 44*b* (FIG. 8A), the records corresponding to the virtual pages to which the real pages are assigned in descending order of access frequency.

Next, the CPU 11*b* adds a record to the migration destination determination table 47 (FIG. 21A) based on the data of the fetched records. The entry 471 of the added record stores the data in the entry 441 of the fetched record; the entry 472 stores the data in the entry 442 of the fetched record; the entry 473 stores the data in the entry 443 of the fetched record; the entry 474 stores the data in the entry 444 of the fetched record; and the entry 475 stores data indicating the state of being not determined yet, for example, TBD. The above-mentioned processing is executed for all the records corresponding to the virtual pages to which the real pages are assigned in the mapping table 44*b* (S2701).

Next, the CPU 11*b* selects as many records in the migration destination determination table 47 as the number of pages in the real LUs in the direct-attached storage apparatus DS2 in descending order of access frequency (S2702). Then, the CPU 11*b* stores the ID (DS2) of the direct-attached storage apparatus 2 in the migration destination computer SV2 in the entry 475 (S2703). Finally, the CPU 11*b* stores the ID of the external storage apparatus 3 in the entry 475 of the remaining records (S2704). This is done in consideration of prevention of consumption of real pages in the DS2 by the VM migration.

Incidentally, as a variation, it is possible to assign a free real page in the DS2 to the RP11 without migrating the RP21 in the DS2 to the RP41.

After creating the migration destination determination table 47 (FIG. 21A) as described above, the CPU 11*b* for the migration destination computer (SV2) transmits a response 2003 for the virtual LU migration request to the migration source computer (SV1). If the migration source computer (SV1) receives the virtual LU migration response 2003, the CPU 11*a* for the migration source computer (SV1) transmits a VM migration request 2004 to the migration destination computer (SV2) according to the VM control program 37.

If the migration destination computer (SV2) receives the VM migration request 2004, the CPU 11*b* for the migration destination computer (SV2) creates a migrated VM using the information included in the virtual LU migration request 2002 according to the VM control program 37 and transmits a VM migration response 2005 to the migration source computer (SV1).

If the migration source computer (SV1) receives the VM migration response 2005, the CPU 11*a* for the migration source computer (SV1) stops the migrated VM, and executes the processing for deleting the VM. The CPU 11*a* updates the VM table 41*a*, the virtual LU table 42*a*, the mapping table 44*a*, and the external storage page table 46*a* according to the distribution control program 32. Specifically speaking, the CPU 11*a* deletes the record transmitted to the migration destination computer SV2 from among the records of these tables. Then, the CPU 11*a* transmits a VM migration response 2006 to the management terminal 4 according to the management terminal communication program 35. FIG. 4B shows the system at this point in time.

Next, the status of the data in the migrated VM makes the transition from the state where the VM is being migrated, to the state of destaging in the migration destination computer SV2. Therefore, the CPU 11*c* for the management terminal 4 changes, according to the VM migration program 52, the entry 642 in the status table (FIG. 21B) to the data indicating that destaging is in process in the migration destination computer, for example, Destaging in Migration Destination Computer; and also changes, according to the screen control program 51, the area 2202 (FIG. 22A) to a message indicating that destaging is in process in the migration destination computer SV2, for example, Destaging in Migration Destination Computer. Then, the CPU 11*c* for the management terminal 4 transmits a migration destination computer destaging request 2007 to the migration destination computer SV2 according to the computer communication program 53.

If the migration destination computer SV2 receives the migration destination computer destaging request 2007, the CPU 11*b* for the migration destination computer SV2 executes destaging processing 1 according to the distribution control program 32. The destaging processing 1 is the processing for destaging data from the direct-attached storage apparatus DS2 in the migration destination computer SV2 to the external storage apparatus ES1.

Figure 28:
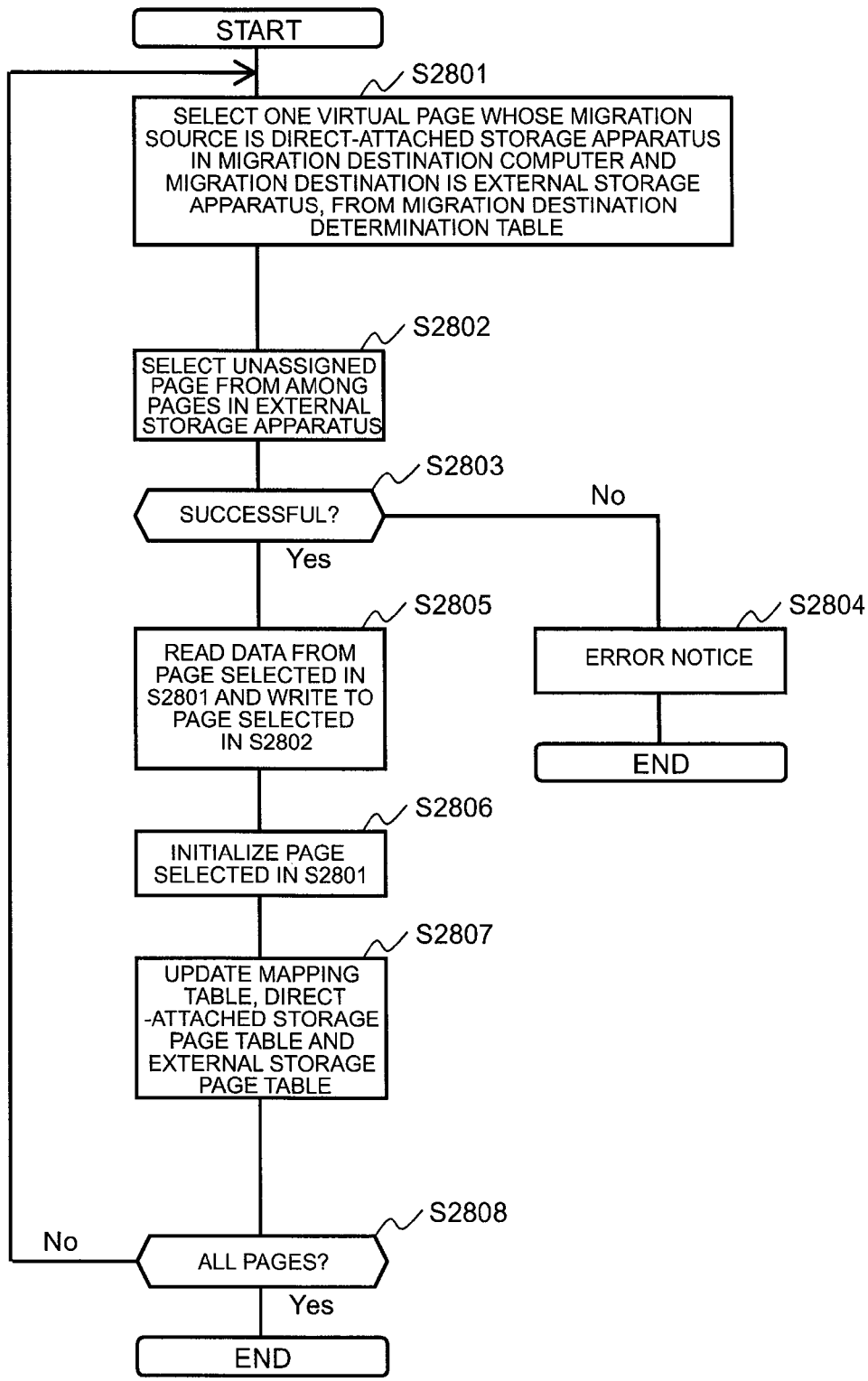
FIG. 28 is a flowchart illustrating processing for destaging data from the direct-attached storage apparatus in the migration destination computer to the external storage apparatus.

FIG. 28 shows an example of a flowchart illustrating the destaging processing 1. Firstly, the CPU 11*b* for the migration destination computer SV2 refers to the migration destination determination table 47 (FIG. 21A) and selects one virtual page whose migration source storage apparatus is the direct-attached storage apparatus DS2 for the migration destination computer SV2 and whose migration destination storage apparatus is the external storage apparatus ES1 (S2801).

Next, the CPU 11*b* refers to the external storage page table 46*b* (FIG. 9) and selects an unassigned real page in the external storage apparatus 3 (S2802). The CPU 11*b* makes the processing branch based on whether this selection is done successfully or not (S2803). If the selection fails, the CPU 11 notifies the administrator of the occurrence of an error (S2804). If the selection is done successfully, the CPU 11 reads the data from the real page in the direct-attached storage apparatus DS2 assigned to the virtual page selected in S2801 and writes the data to the real page in the external storage apparatus selected in S2802 (S2805). Next, the CPU 11 initializes the data of the real page selected in S2801 (S2806).

Then, the CPU 11*b* updates the mapping table 44*b* (FIG. 8A), the direct-attached storage page table 45*b* (FIG. 8B), and the external storage page table 46*b* (FIG. 9) (S2807). Specifically speaking, the CPU 11*b* changes, from among the records in the mapping table 44*b*, the entry 444 of the record corresponding to the virtual page selected in S2801 to the ID of the external storage apparatus 3, the entry 445 to the LUN of the real LU of the external storage apparatus ES1, and the entry 446 to the ID of the real page selected in S2802, respectively.

Furthermore, the CPU 11*b* changes the entry 454 of the record in the direct-attached storage page table 45*b* corresponding to the real page assigned to the virtual page selected in S2801 to the data indicating the state of being reserved, for example, RESERVED. Furthermore, the CPU 11*b* changes the entry 464 of the record in the external storage page table 46*b* corresponding to the real page selected in S2802 to the data indicating the state of being already assigned.

The CPU 11*b* for the migration destination computer SV2 repeats the processing from S2801 to S2807 for all the real pages whose migration source storage apparatus is the direct-attached storage apparatus 2 of the migration destination computer and whose migration destination storage apparatus is the external storage apparatus 3 (S2808).

FIG. 24 shows an example of the data structure of the tables after the destaging processing 1 is completed. The record 4402 of the mapping table 44*b* (FIG. 24A), the record 4502 of the direct-attached storage page table 45*b* (FIG.

24B), and the record 4602 of the external storage page table 46b (FIG. 24C) are respectively changed. After completing the destaging processing 1, the CPU 11 for the migration destination computer (SV2) transmits a migration destination computer destaging response 2008 to the management terminal 4. FIG. 5C shows the computer system at this point in time.

Next, the status of the data related to the migrated VM makes the transition from the state of destaging in the migration destination computer SV2 to the state of migration between direct-attached storage apparatuses. Therefore, the CPU 11c for the management terminal 4 changes, according to the VM migration program 52, the entry 642 in the status table (FIG. 21B) to the data indicating that migration between direct-attached storage apparatuses is in process, for example, Being Migrated between Direct-attached Storage Apparatuses; and also changes, according to the screen control program 51, the area 2202 to a message indicating that migration between direct-attached storage apparatuses is in process, for example, Being Migrated between Direct-attached Storage Apparatuses. Then, the CPU 11c for the management terminal 4 transmits a request 2009 for migration between direct-attached storage apparatuses to the migration destination computer SV2 according to the computer communication program 53.

Figure 29:
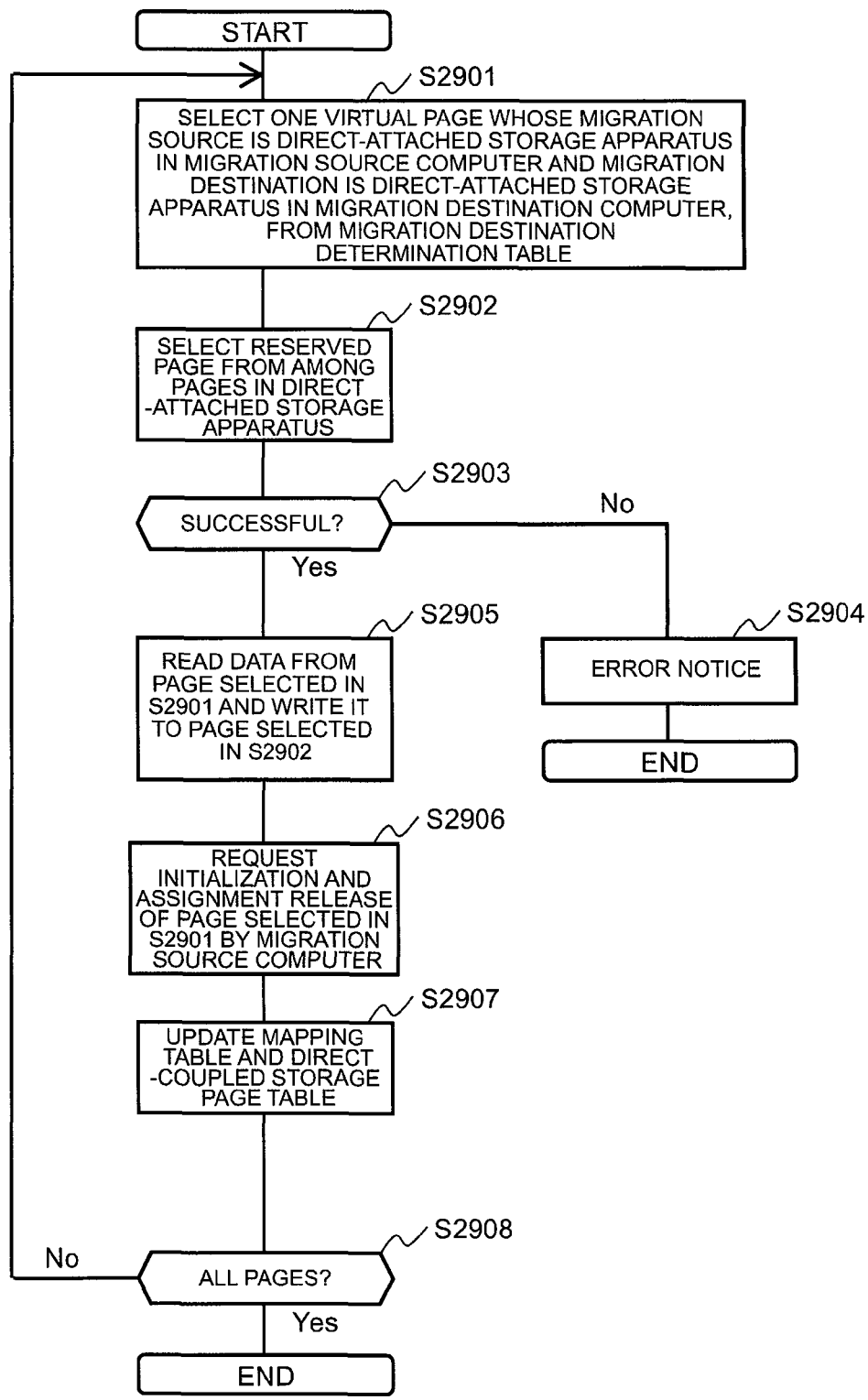
FIG. 29 is a flowchart illustrating processing for data migration between direct-attached storage apparatuses.

If the migration destination computer SV2 receives the request 2009 for migration between direct-attached storage apparatuses, the CPU 11b for the migration destination computer SV2 executes processing for migrating data between direct-attached storage apparatuses according to the distribution control program 32. FIG. 29 shows an example of a flowchart illustrating the processing for migration between direct-attached storage apparatuses. Firstly, the CPU 11b for the migration destination computer SV2 refers to the migration destination determination table 47 (FIG. 21A) and selects one virtual page whose migration source storage apparatus is the direct-attached storage apparatus DS1 for the migration source computer SV1 and whose migration destination storage apparatus is the direct-attached storage apparatus DS2 for the migration destination computer SV2 (S2901). As a result of this, a virtual page VP11 is selected.

Next, the CPU 11b refers to the direct-attached storage page table 45b (FIG. 8B) and selects a reserved page in the direct-attached storage apparatus DS2 (S2902). This reservation is executed in step S2807 in FIG. 28. Instead of selecting a reserved page, an unassigned real page may be selected. The CPU 11b makes the processing branch based on whether this selection is done successfully or not (S2903). If the selection fails, the CPU 11 notifies the administrator of the occurrence of an error (S2904).

If the selection is done successfully, the CPU 11b reads data from the real page in the migration source storage apparatus DS1 assigned to the virtual page selected in S2901 and writes the data to the real page in the migration destination storage apparatus selected in S2902 (S2905). The CPU 11b requests with regard to the real page in the migration source storage apparatus DS1 assigned to the virtual page selected in S2901 that the migration source computer SV1 initializes the data and releases the assignment (S2906). After receiving a response to this request from the CPU 11a for the migration source computer SV1, the CPU 11b updates the mapping table 44b (FIG. 8A) and the direct-attached storage page table 45b (FIG. 8B) (S2907).

Specifically speaking, from among the records in the mapping table 44b, the CPU 11b changes the entry 444 of the record corresponding to the virtual page selected in S2901 to the ID of the direct-attached storage apparatus DS2, the entry 445 to the LUN of the real LU in the direct-attached storage apparatus DS2, and the entry 446 to the ID of the real page selected in S2902.

Furthermore, the CPU 11 changes the entry 454 of the record in the direct-attached storage page table 45b corresponding to the real page selected in S2902 to the data indicating the state of not being assigned. The CPU 11b repeats the processing from S2901 to S2907 with respect to all the real pages whose migration source storage apparatus is the direct-attached storage apparatus DS1 for the migration source computer SV1 and whose migration destination storage apparatus is the direct-attached storage apparatus DS2 for the migration destination computer SV2 (S2908).

FIG. 25 shows an example of the data structure of the tables after the processing for migration between direct-attached storage apparatuses is completed. The record 4403 of the mapping table 44b, the record 4503a of the direct-attached storage page table 45a in the migration source computer, and the record 4503b of the direct-attached storage page table 45b in the migration destination computer are respectively changed.

After completing the processing for migration between the direct-attached storage apparatuses, the CPU 11b for the migration destination computer SV2 transmits a response 2010 for the migration between the direct-attached storage apparatuses to the management terminal 4. FIG. 5A shows the system at this point in time.

At this point in time, the status of the data in the migrated VM makes the transition from the state of migration between the direct-attached storage apparatuses to the state of destaging in the migration source computer. Therefore, the CPU 11c for the management terminal 4 changes, according to the VM migration program 52, the entry 642 in the status table 64 (FIG. 21B) to the data indicating that destaging in the migration source computer is in process, for example, Destaging in the Migration Source Computer; and also changes, according to the screen control program 51, the area 2202 to a message indicating that destaging in the migration source computer is in process, for example, Destaging in the Migration Source Computer. Then, the CPU 11 for the management terminal 4 transmits a migration source computer destaging request 2011 to the migration destination computer (SV2) according to the computer communication program 53.

If the migration destination computer SV2 receives the migration source computer destaging request 2011, the CPU 11b for the migration destination computer SV2 executes destaging processing 2 according to the distribution control program 32. The destaging processing 2 is processing for destaging data from the direct-attached storage apparatus 2 in the migration source computer to the external storage apparatus 3.

Figure 30:
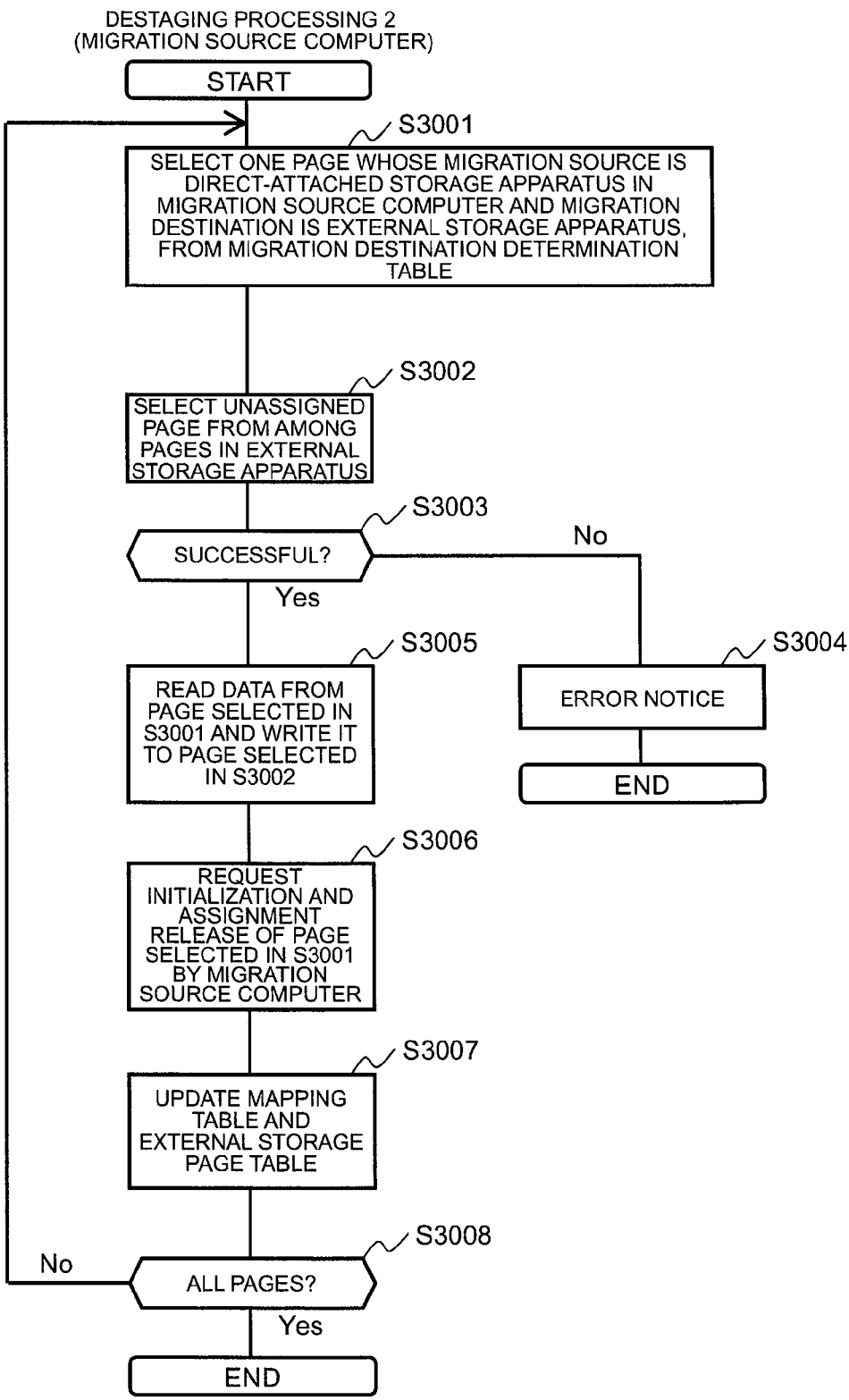
FIG. 30 is a flowchart illustrating processing for destaging data from the direct-attached storage apparatus in the migration source computer to the external storage apparatus.

FIG. 30 shows an example of a flowchart illustrating the destaging processing 2. Firstly, the migration destination computer CPU 11b refers to the migration destination determination table 47 (FIG. 21) and selects one virtual page whose migration source storage apparatus is the direct-attached storage apparatus DS1 for the migration source computer SV1 and whose migration destination storage apparatus is the external storage apparatus ES1 (S3001).

Next, the CPU 11b refers to the external storage page table 46b (FIG. 9) and selects an unassigned real page in the external storage apparatus 3 (S3002). The CPU 11b makes the processing branch based on whether this selection is done successfully or not (S3003).

If the selection fails, the CPU 11*b* notifies the administrator of the occurrence of an error (S3004). If the selection is done successfully, the CPU 11*b* reads data from the real page in the direct-attached storage apparatus DS1 assigned to the virtual page selected in S3001 and writes the data to the real page in the external storage apparatus ES1 selected in S3002 (S3005).

Next, the CPU 11*b* requests with regard to the real page assigned to the virtual page selected in S3001 that the migration source computer SV1 initializes the data and releases of the assignment (S3006). After receiving a response corresponding to this request, the CPU 11*b* updates the mapping table 44*b* (FIG. 26A) and the external storage page table 46*b* (FIG. 26C) (S3007).

Specifically speaking, from among the records in the mapping table 44*b*, the CPU 11*b* changes the entry 444 of the record corresponding to the virtual page selected in S3001 to the ID of the external storage apparatus 3, the entry 445 to the LUN of the real LU in the external storage apparatus 3, and the entry 446 to the ID of the real page selected in S3002.

Furthermore, the CPU 11*b* changes the entry 454 of the record in the external storage page table 46*b* corresponding to the real page selected in S3002 to the data indicating the state of being already assigned. The CPU 11*b* repeats the processing from S3001 to S3007 with respect to all the real pages whose migration source storage apparatus DS1 is the direct-attached storage apparatus for the migration source computer SV1 and whose migration destination storage apparatus is the external storage apparatus ES1 (S3008).

Next, an example of the data structure of the table data after the destaging processing 2 (FIG. 30) is completed will be explained. The record 4404 of the mapping table 44*b* (FIG. 26A) in the migration destination computer SV2, the record 4504 of the direct-attached storage page table 45*a* (FIG. 26B) in the migration source computer SV1, and the record 4604 of the external storage page table 46*b* (FIG. 26C) in the migration destination computer SV2 are respectively changed. Incidentally, the above description of S3005 is based on the assumption that the migration destination computer SV2 reads data of the direct-attached storage apparatus DS1 from the migration source computer SV1 and migrates the data to the external storage apparatus ES1; however, the migration destination computer SV2 may give a command to the migration source computer SV1 to migrate data from the direct-attached storage apparatus DS1 to the external storage apparatus ES1. It should be noted that transmission of a migration source computer destaging request 2011 to the migration source computer is not precluded.

After completing the destaging processing 2, the CPU 11*b* for the migration destination computer SV2 transmits a migration source computer destaging response 2012 to the management terminal 4 and clears the data of the migration destination determination table 47 (FIG. 21A). FIG. 6 shows the status of the computer system at this point in time.

Finally, if the management terminal 4 receives the migration source computer destaging response 2012, the CPU 11*c* for the management terminal 4 changes the VM table 62 (FIG. 10B) according to the VM migration program 52. Specifically speaking, the CPU 11*c* changes the entry 632 of the record corresponding to the VM, which is the migration target in the VM table 62, to the ID of the migration destination computer 1 (SV1).

It should be noted that if the reason for VM migration is, for example, planned maintenance, there is a high possibility that after migrating a VM to the migration destination computer, the administrator may migrate the VM again to the migration source computer. In this case, by leaving the data of the VM in the direct-attached storage apparatus 2 for the migration source computer without executing the destaging processing 2, the time it takes to migrate data during the migration can be shortened and, at the same time, data migration upon the remigration can be made unnecessary. In this embodiment, this type of operation mode is referred to as a high-speed remigration mode. In this case, a checkbox for the administrator to command the operation in the high-speed remigration mode is added to the VM migration screen 2200.

Furthermore, in S2906 of the processing for migration between the direct-attached storage apparatuses described in FIG. 29, the CPU 11*b* requests that the migration source computer makes the real page in the migration destination computer, which is assigned to the virtual page selected in S2901, temporarily unavailable. Then, in S2907, the CPU 11*b* saves the content of the record corresponding to the virtual page selected in S2901, from among the records in the mapping table 44*b*, in the main memory 12*b* before updating such record. The content of the record may be saved, for example, in the entry 447 added to the mapping table 44*b* (FIG. 8B). Then, when the VM is migrated again to the migration source computer, the correspondence relationship between the virtual page selected in S2901 and the real page originally assigned to the virtual page (the real page in the direct-attached storage apparatus 2 for the migration source computer) is recovered in accordance with the content saved in the entry 447.

If the computer system according to the above-mentioned embodiment is used as described above, when a VM is migrated from the first storage system to the second storage system, the migration destination storage system stores the data in the VM of the migration source storage system, as well as the data of its own VM, in the hierarchized storage areas in the migration destination storage system. Therefore, even if the VM is migrated between multiple computers, the quality of storage hierarchization control for the multiple computers can be maintained and the data management in the computer system can be improved.

Figure 31:
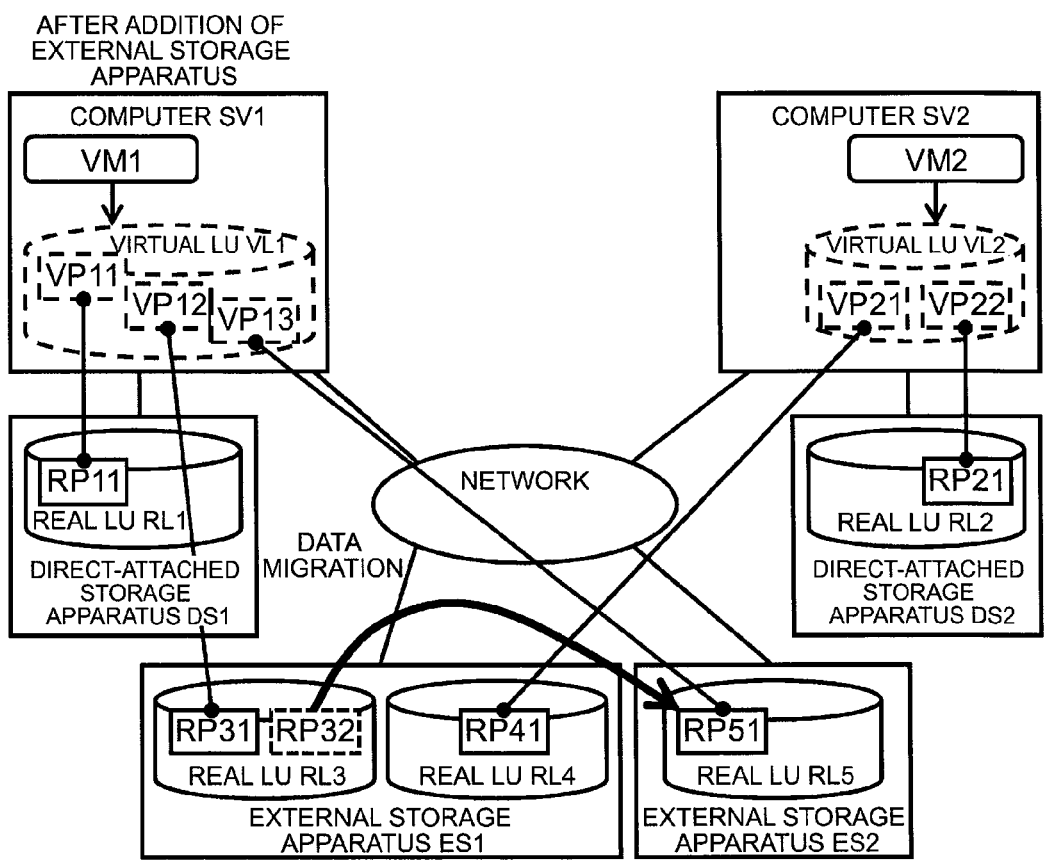
FIG. 31 is a block diagram of the computer system after an external storage apparatus is additionally installed.

Next, regarding the second embodiment of this invention, only the part of the second embodiment that is different from the first embodiment will be described with reference to FIG. 31 and FIG. 32. The second embodiment is designed so that when an external storage apparatus ES2 is additionally installed to the shared storage in the computer system (FIG. 31), the CPU 11 in the computer SV1 or the computer SV2 migrates, according to the storage control program 38, data of an already existing external storage apparatus 3 to the additionally installed external storage apparatus 3, thereby expanding the performance and capacity.

Firstly, an example of the system operation according to this embodiment will be described with reference to FIG. 31. A VM1 is operating in the computer SV1. The VM1 accesses a virtual LU (VL1). The virtual LU (VL1) is composed of at least a VP11, a VP12, and a VP13. A direct-attached storage apparatus DS1 is directly connected to the computer SV1 and provides a real LU (RL1) to the computer SV1. The real LU (RL1) is composed of at least a real page RP11. An external storage apparatus ES1 provides a real LU (RL3) to the computer SV1 via a network 5. The real LU (RL3) is composed of at least real pages RP31 and RP32. The real page RP11 is assigned to the virtual page VP11, the real page RP31 is assigned to the virtual page VP12, and the real page RP32 is assigned to the virtual page VP13.

On the other hand, a VM2 is operating in the computer SV2. The VM2 accesses a virtual LU (VL2). The virtual LU (VL2) is composed of at least virtual pages VP21 and VP22. A direct-attached storage apparatus DS2 is directly connected to the computer SV2 and provides a real LU (RL2) to the computer SV2. The real LU (RL2) is composed of at least a real page RP21. The external storage apparatus ES1 provides a real LU (RL4) to the computer SV2 via the network 5. The real LU (RL4) is composed of at least a real page RP41. The real page RP41 is assigned to the virtual page VP21, and the real page RP21 is assigned to the virtual page VP22.

It is assumed that the administrator connects an external storage apparatus 3 whose ID is ES2 to the network 5. The external storage apparatus ES2 provides a real LU whose ID is RL5 to the computer SV1 via the network 5. The real LU (RL5) is composed of at least a real page whose ID is RP51. Because there is only little free capacity in the real LU (RL3) or because the performance of the external storage apparatus ES1 is deteriorated due to the high access frequency of the real LU (RL3), the data of the real page RP32 constituting the real LU (RL3) is migrated to the real page RP51. This migration is referred to as the migration between external storage apparatuses. Then, the real page RP51 is reassigned to the virtual page VP13 and the assignment of the real page RP32 to the virtual page VP13 is canceled.

Figure 32:
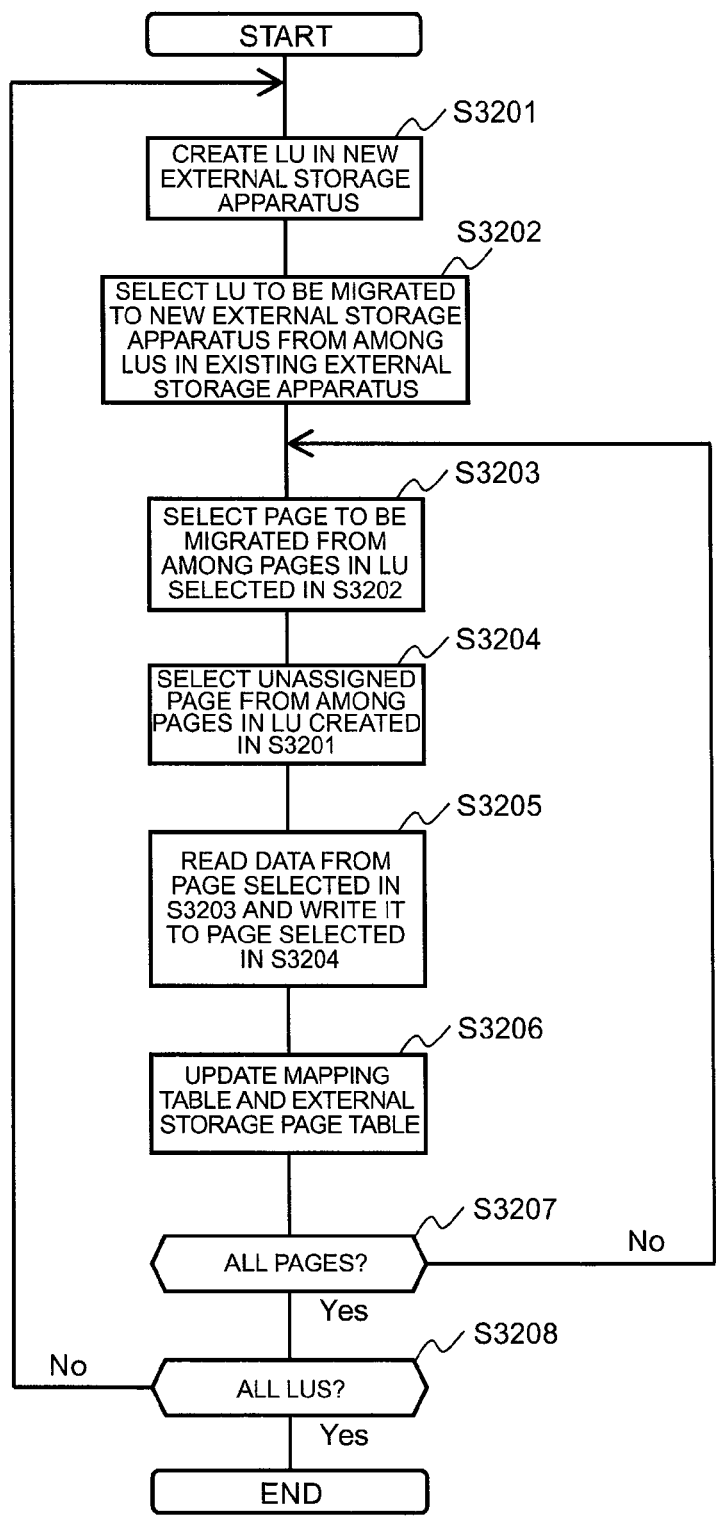
FIG. 32 shows an example of a flowchart illustrating processing for data migration between multiple external storage apparatuses.

FIG. 32 is an example of a flowchart illustrating the processing executed by the CPU 11a in the computer SV1 for migrating data between external storage apparatuses according to the distribution control program 32. This processing is executed when the administrator adds the second and subsequent external storage apparatuses ES1 to the system by using the external storage addition screen 1110. Firstly, the CPU 11a requests that the added external storage apparatus ES2 creates an LU; and then adds a record to the external storage page table 46a (FIG. 9) (S3201).

Next, the CPU 11 selects a real LU whose data is to be migrated to the added external storage apparatus ES2, from among the real LUs in the already existing external storage apparatus ES1 (S3202). Next, the CPU 11a selects a real page whose data is to be migrated, from among the real pages constituting the real LU selected in S3202, (S3203). The CPU 11a selects an unassigned real page from among the real pages in the real LU created in S3201 (S3204). The CPU 11a reads data from the real page selected in S3203, writes the data to the real page selected in S3204 (S3205), and initializes the data of the real page selected in S3203. Then, the CPU 11a updates the mapping table 44a and the external storage page table 46a (S3206). The CPU 11a executes the processing from S3203 to S3206 with respect to all the pages (S3207). Furthermore, the CPU 11a executes the processing from S3201 to S3207 with respect to all the real LUs (S3208).

Next, regarding the third embodiment of this invention, only the part of the third embodiment that is different from the first embodiment will be described with reference to FIG. 33. The third embodiment is characterized in that a storage apparatus having high-speed but expensive storage media is not directly connected to the computer 1, but is embedded in the computer 1.

Figure 33:
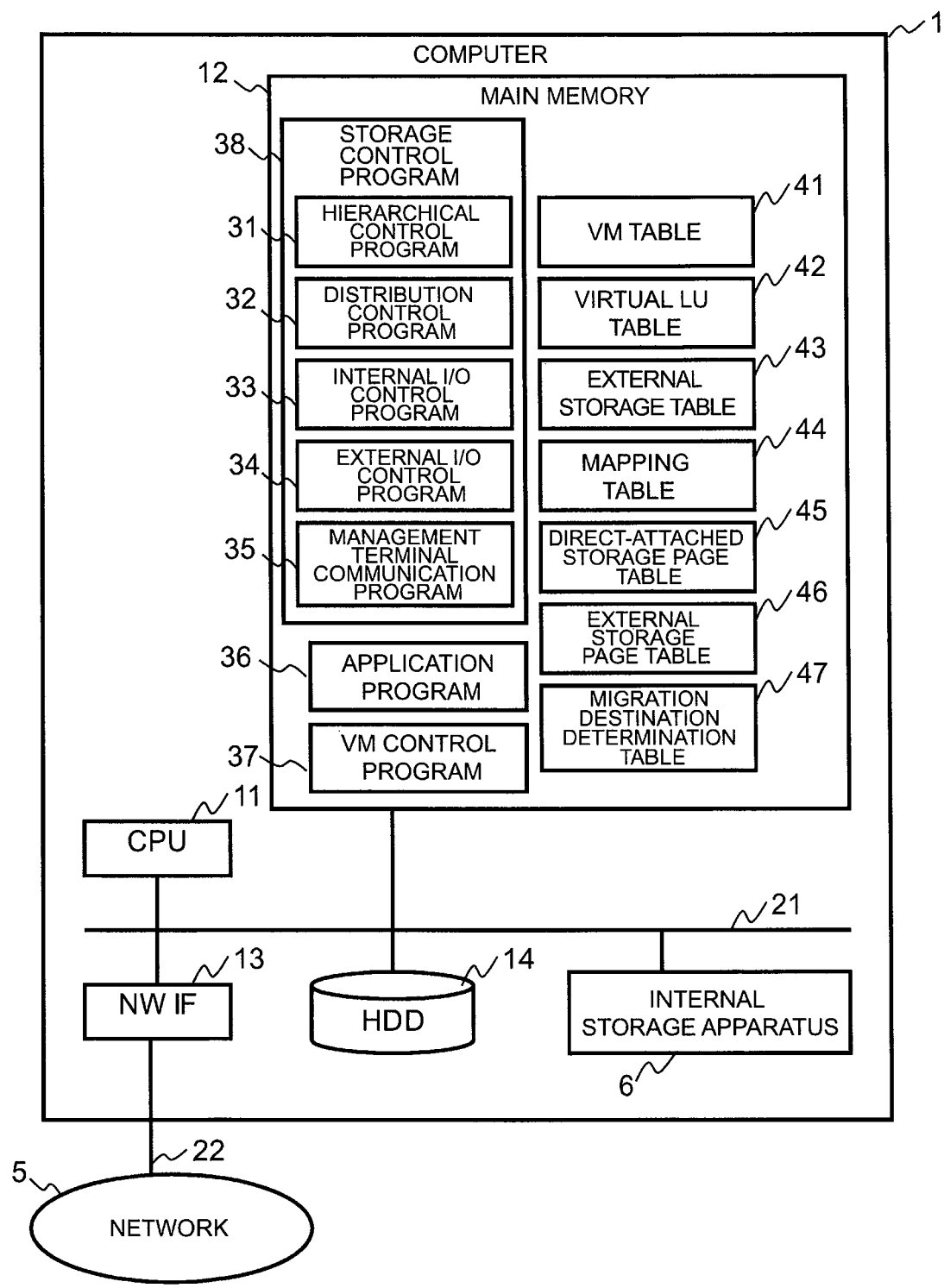
FIG. 33 is a block diagram describing a variation of a computer.

FIG. 33 is a block diagram showing a variation of the computer 1. The computer 1 is constituted from a CPU 11, a main memory 12, an NW IF 13, an HDD 14, an internal storage apparatus 6, and a communication line 21 such as a bus. The internal storage apparatus 6 is the same as the direct-attached storage apparatus 2 in the first embodiment, except that the internal storage apparatus 6 is embedded in the computer 1.

Next, regarding the fourth embodiment of this invention, only the part of the fourth embodiment that is different from the first embodiment will be described with reference to FIG. 34 and FIG. 35. The programs executed by the computer according to the first embodiment are executed by the CPU 11 in the direct-attached storage apparatus 2 according to the fourth embodiment.

Figure 34:
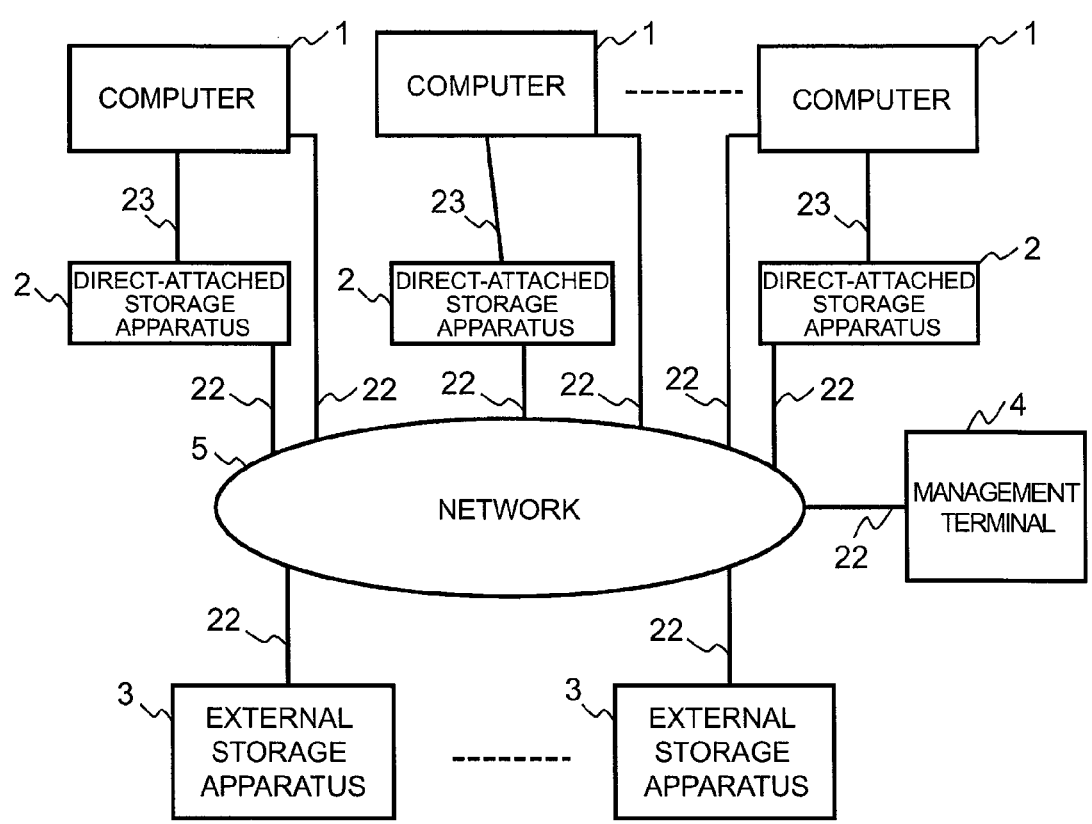
FIG. 34 is a hardware block diagram of a computer system according to another embodiment.

FIG. 34 shows an example of the system configuration according to this embodiment. The components of this system are the same as the first embodiment, except that direct-attached storage apparatuses 2 are connected to the network 5 via the communication line 22.

Figure 35:
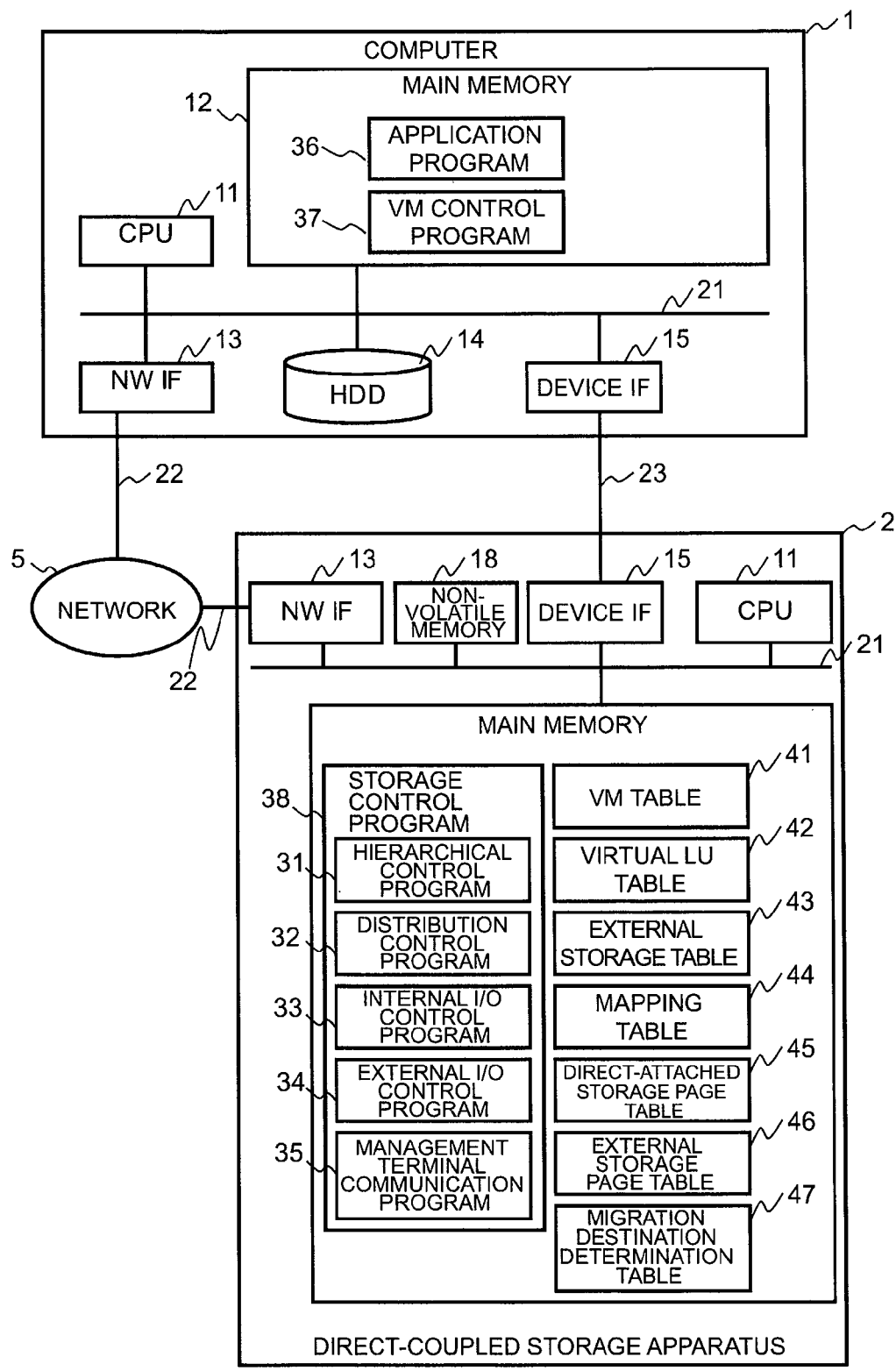
FIG. 35 is a detailed block diagram of a computer according to the embodiment shown in FIG. 34 and a storage apparatus directly connected to the computer.

FIG. 35 shows an example of the configuration of a computer 1 and a direct-attached storage apparatus 2 in this embodiment. The CPU 11 for the computer 1 executes the application program 36 and the VM control program 37. When the CPU 11 writes data to a virtual LU according to the application program 36, the CPU 11 transmits a request to the direct-attached storage apparatus 2 to write the data according to the VM control program 37. On the other hand, when the CPU 11 reads data from the virtual LU according to the application program 36, the CPU 11 transmits a request to the direct-attached storage apparatus 2 to read the data according to the VM control program 37.

The direct-attached storage apparatus 2 is constituted from a CPU 11, a main memory 12, an NW IF 13, a device IF 15, a communication line 21, and one or more non-volatile memories 18. The non-volatile memory may be, for example, a flash memory, a PRAM (Phase change RAM), or an SSD. The CPU 11 for the direct-attached storage apparatus 2 executes the storage control program 38. Meanwhile, the main memory 12 for the direct-attached storage apparatus 2 stores tables such as a VM table 41, a virtual LU table 42, an external storage table 43, a mapping table 44, a direct-attached storage page table 45, an external storage page table 46, and a migration destination determination table 47.

The CPU 11 for the direct-attached storage apparatus 2 executes various types of processing, which is executed by the CPU 11 for the computer 1 according to the first embodiment, according to the storage control program 38.

INDUSTRIAL APPLICABILITY

This invention provides a computer system using the computer virtualization technology and the storage hierarchization technology and also provides a data storage control method for such a computer system.

The invention claimed is:
1. A system comprising:
a plurality of computers including a first computer and a second computer,
wherein the first computer includes a plurality of first storage devices and a first controller executing a first storage control program managing a plurality of first storage areas formed by the plurality of first storage devices and executing an application program on a virtual machine,
wherein data used by the application program is stored in the first storage areas in the first computer and the first storage control program monitors respective access frequencies of each of the first storage areas,
wherein the second computer includes a plurality of second storage devices and a second controller execut- ing a second storage control program managing a plurality of second storage areas formed by the plurality of second storage devices, wherein, when the virtual machine is migrated from the first computer to the second computer, the first computer and the second computer:

migrate data stored in a part of the first storage areas, which have respective access frequencies higher than a predetermined threshold, from the first computer to the second computer on the basis of the monitored access frequencies, and determine not to migrate data stored in another part of the first storage areas, which have respective access frequencies lower than the predetermined threshold, from the first computer to the second computer on the basis of the monitored access frequencies, wherein, after migration of the virtual machine from the first computer to the second computer, the second controller executes the second storage control program and the application program on the migrated virtual machine, the migrated data used by the application program is stored in the second storage areas of the second computer, and the data stored in the other part of the first storage areas in the first computer is also used by the application program, wherein the application program executed by the second controller in the second computer issues a plurality of read requests, wherein, for each one of the read requests, the second storage control program executed by the second controller in the second computer:

receives the respective one of the read requests, when data related to the respective one of the read requests is stored in one of the second storage areas in the second computer, reads the data stored in the one of the second storage areas, and when the data related to the respective one of the read requests is stored in a one of the first storage areas in the first computer, requests the first computer to transmit the data, whereby:

the first storage control program executed by the first controller in the first computer:

reads the data stored in the one of the first storage areas, transmits the data to the second computer, and the second storage control program executed by the second controller in the second computer:

sends a response related to the respective one of the read requests using the data to the application program executed in the second computer.

2. The system according to claim 1, wherein the data transmitted from the first computer to the second computer is handled by the first controller executing the first storage control program in the first computer.

3. The system according to claim 1, wherein the first controller executing the first storage control program in the first computer and the second controller executing the second storage control program in the second computer communicate with each other over a network.

4. A system comprising:

a plurality of nodes including a first node and a second node, wherein the first node includes a plurality of first storage devices and a first controller executing a first storage control program managing one or more first storage areas formed by the plurality of first storage devices and executing a virtual machine, wherein data used by the virtual machine is stored in the first storage areas in the first computer and the first storage control program monitors respective access frequencies of each of the first storage areas, wherein the second node includes a plurality of second storage devices and a second controller executing a second storage control program managing one or more second storage areas formed by the plurality of second storage devices, wherein, when the virtual machine is migrated from the first node to the second node, the first node and the second node;

migrate data stored in a part of the first storage areas, which have respective access frequencies higher than a predetermined threshold, from the first node to the second node on the basis of the monitored access frequencies, and determine not to migrate data stored in another part of the first storage areas, which have respective access frequencies lower than the predetermined threshold, from the first node to the second node on the basis of the monitored access frequencies, wherein, after migration of the virtual machine from the first node to the second node, the second controller executes the second storage control program and the migrated virtual machine, the migrated data used by the migrated virtual machine is stored in the second storage areas in the second node, and the data stored in the other part of the first storage areas in the first node is also used by the migrated virtual machine, wherein the migrated virtual machine executed by the second controller in the second node issues a plurality of read requests, wherein, for each one of the read requests, the second storage control program executed by the second controller in the second node:

receives the respective one of the read requests, when data related to the respective one of read requests is stored in one of the second storage areas in the second node, reads the data stored in the one of the second storage areas, and when the data related to the respective one of the read requests is stored in a one of the first storage areas in the first node, requests the first node to transmit the data, whereby:

the first storage control program executed by the first controller in the first node:

reads the data stored in the one of the first storage areas, transmits the data to the first second node, and the second storage control program executed by the second controller in the second node:

responds to the respective one of the read requests using the data to the migrated virtual machine in the second node.

5. The system according to claim 4, wherein the data transmitted from the first node to the second node is handled by the first controller executing the first storage control program in the first node.

6. The system according to claim 4, wherein the first controller executing the first storage control program in the first node and the second controller executing the second storage control program in the second node communicate with each other over a network.

7. A system comprising:
a first system including a plurality of first storage devices, a first controller executing a first storage control program managing a plurality of first storage areas formed by the plurality of first storage devices and executing a virtual machine, wherein data used by the virtual machine is stored in the first storage areas in the first computer and the first storage control program monitors respective access frequencies of each of the first storage areas; and
a second system including a plurality of second storage devices and a second controller executing a second storage control program managing a plurality of second storage areas formed by the plurality of second storage devices,
wherein, when the virtual machine is migrated from the first system to the second system, the first system and the second system:
migrate data stored in a part of the first storage areas, which have respective access frequencies higher than a predetermined threshold, from the first system to the second system on the basis of the monitored access frequencies, and
determine not to migrate data stored in another part of the first storage areas, which have respective access frequencies lower than the predetermined threshold, from the first system to the second system on the basis of the monitored access frequencies,
wherein, after migration of the virtual machine from the first system to the second system, the second controller executes the second storage control program and the migrated virtual machine, the migrated data used by the migrated virtual machine is stored in the second storage areas in the second system, and the data stored in the other part of the first storage areas in the first system is also used by the migrated virtual machine,
wherein the migrated virtual machine executed by the second controller in the second system issues a plurality of read requests,
wherein, for each one of the read requests, the second storage control program executed by the second controller in the second system:
receives the respective one of the read requests,
when data related to the respective one of the read requests is stored in one of the second storage areas in the second system, reads the data stored in the one of the second storage areas, and
when the data related to the respective one of the read requests is stored in one of the first storage areas in the first system, requests the first system to transmit the data, whereby:
the first storage control program executed by the first controller in the first system:
reads the data stored in the one of the first storage areas,
transmits the data to the second system, and
the second storage control program executed by the second controller in the system:
sends a response related the respective one of the read requests using the data to the migrated virtual machine in the first system.

8. The system according to claim 7,
wherein the data transmitted from the first system to the second system is handled by the first controller executing the first storage control program in the first system.

9. The system according to claim 7,
wherein the first controller executing the first storage control program in the first system and the second controller executing the second storage control program in the second system communicate with each other over a network.

* * * * *